United States Patent
He et al.

(10) Patent No.: US 9,438,336 B2
(45) Date of Patent: Sep. 6, 2016

(54) CHARACTERIZATION OF NON-ASE NOISE ON OPTICAL SIGNALS

(71) Applicant: EXFO INC., Quebec (CA)

(72) Inventors: Gang He, Quebec (CA); Daniel Gariepy, Quebec (CA); Hongxin Chen, Chino Hills, CA (US); Bernard Ruchet, Quebec (CA)

(73) Assignee: EXFO INC., Quebec, QC ( * ) Notice: Subject to any disclaimer, the term of this patent is extended or adjusted under 35 U.S.C. 154(b) by 164 days.

(21) Appl. No.: 13/965,823

(22) Filed: Aug. 13, 2013

(65) Prior Publication Data

US 2013/0330071 A1    Dec. 12, 2013

Related U.S. Application Data

(63) Continuation of application No. PCT/CA2012/050089, filed on Feb. 16, 2012.

(60) Provisional application No. 61/471,457, filed on Apr. 4, 2011, provisional application No. 61/444,295, filed on Feb. 18, 2011.

(51) Int. Cl.
*H04B 10/073* (2013.01)
*H04J 14/02* (2006.01)
(Continued)

(52) U.S. Cl.
CPC ...... *H04B 10/073* (2013.01); *H04B 10/07953* (2013.01); *H04J 14/02* (2013.01); *H04J 14/06* (2013.01)

(58) Field of Classification Search
None
See application file for complete search history.

(56) References Cited

U.S. PATENT DOCUMENTS

| | | | |
|---|---|---|---|
| 6,870,629 B1 * | 3/2005 | Vogel | G01M 11/331 356/519 |
| 2004/0247319 A1 * | 12/2004 | Melman | H04B 10/077 398/65 |

(Continued)

FOREIGN PATENT DOCUMENTS

| | | |
|---|---|---|
| WO | 2008122123 A1 | 10/2008 |
| WO | 2009062237 A1 | 5/2009 |
| WO | 2011020195 A1 | 2/2011 |

OTHER PUBLICATIONS

Karlsson M. et al., "Effects of Nonlinearities on PMD-Induced System Impairments", Journal of Lightwave Technology, vol. 24, No. 11, Nov. 2006, pp. 4127-4137.

(Continued)

*Primary Examiner* — David Payne
*Assistant Examiner* — Casey Kretzer
(74) *Attorney, Agent, or Firm* — Norton Rose Fulbright Canada LLP; Alexandre Daoust

(57) ABSTRACT

There is provided a method for determining a noise parameter characterizing an optical Signal-Under-Test (SUT) having a signal contribution, an Amplified Spontaneous Emission (ASE) noise contribution and a non-ASE optical noise contribution, such as a carrier-leakage contribution or a depolarized-signal contribution, within an optical-signal bandwidth. The method comprises acquiring optical spectrum trace(s) of the SUT, discriminating at least the non-ASE optical noise contribution from the ASE-noise contribution using the optical spectrum trace(s) and/or a trace obtained from the optical spectrum trace(s); and determining the noise parameter using discriminated non-ASE optical noise contribution and/or the discriminated ASE-noise contribution.

29 Claims, 9 Drawing Sheets

(51) Int. Cl.
*H04J 14/06* (2006.01)
*H04B 10/079* (2013.01)

(56) References Cited

U.S. PATENT DOCUMENTS

| | | | | |
|---|---|---|---|---|
| 2008/0124076 A1* | 5/2008 | Rudolph | ............ | H04B 10/07953 398/26 |
| 2009/0316153 A1* | 12/2009 | Heismann | ........ | H04B 10/07953 356/364 |
| 2010/0322622 A1* | 12/2010 | Shukunami | ...... | H04B 10/07953 398/26 |
| 2011/0222850 A1 | 9/2011 | Roberts et al. | | |

OTHER PUBLICATIONS

Sköld M. et al., "PMD-insensitive DOP-Based OSNR Monitoring by Spectral SOP Measurements", Technical Digest of Optical Fiber Communication Conference OFC/NFOEC 2005, 3 pages.

Xie C et al., "Influence of Polarization Scattering on Polarization-Assisted OSNR Monitoring in Dense WDM Systems with NZ-DSF and Raman Amplification", Technical Digest of Optical Fiber Communication Conference OFC/NFOEC 2005, 3 pages.

Gariepy D. et al., "Novel OSA-Based Method for In-Band OSNR Measurement", Technical Digest of Optical Fiber Communication Conference OFC/NFOEC 2010, 3 pages.

Xie C. et al., "Orthogonal Polarization Heterodyne OSNR Monitoring Technique Insensitive to Polarization Effects", Technical Digest of Optical Fiber Communication Conference OFC/NFOEC 2006, 3 pages.

Dlubek M.P et al., "Method for optical signal-to-noise ratio monitoring based on modulation spectrum assessment", IET Optoelectronics, vol. 3, Issue 2, pp. 86-92, 2009.

Feuer M. D. et al., "Measurement of OSNR in the Presence of Partially Polarized ASE", IEEE Photonics Technology Letters, vol. 17, No. 2, Feb. 2005 pp. 435-437.

JDSU Uniphase Corporation, "Measuring the Optical Signal-to-Noise Ration in Agile Optical Networks", Technical Note, available at http://www.jdsu.com/product-literature/AON_tn_fop_tm_ae.pdf, 2005, pp. 1-10.

Flood E. et al., "OSNR Monitoring using Two Fibre Interferometers", Technical Digest of Optical Fiber Communication Conference OFC/NFOEC 2010, 2 pages.

Bakaul M., 2008, "Low-Cost PMD-Insensitive and Dispersion Tolerant In-Band OSNR Monitor Based on Uncorrelated Beat Noise Measurement.", IEEE Photonics Technology Letters, vol. 20, No. 11, pp. 906-908.

Martinez J. J. et al., "Novel In-Band OSNR Monitoring System Based on a Polarization Interferometer", Photonics Technologies Group, Universidad de Zaragoza, 3 pages.

Dahan D. et al., "Optical Performance monitoring for translucent/transparent optical networks", IET Optoelectronics, vol. 5, Issue 21 pp. 1-18, 2011.

\* cited by examiner

CHARACTERIZATION OF NON-ASE NOISE ON OPTICAL SIGNALS

CROSS-REFERENCE TO RELATED APPLICATIONS

This application is a continuation of PCT/CA2012/050089 filed Feb. 2, 2012, the specification of which is hereby incorporated by reference, and which claims priority under 35 USC §119(e) of both U.S. provisional patent application 61/444,295 filed Feb. 18, 2011; and of U.S. provisional patent application 61/471,457 filed Apr. 4, 2011; the specifications of which are hereby incorporated by reference.

This application is also related to PCT patent application serial number PCT/CA2008/000647 filed on Apr. 4, 2008, designating the United States, now pending as a national phase entry in the United States under serial number U.S. Ser. No. 12/594,503; to PCT patent application serial number PCT/CA2010/001285 filed on Aug. 19, 2010, designating the United States, now pending as a national phase entry in the United States under serial number U.S. Ser. No. 12/859,648; and to PCT patent application serial number PCT/CA2011/050085 filed on Feb. 14, 2011 and designating the United States; the specifications of which are hereby all incorporated by reference.

TECHNICAL FIELD

The invention relates to the determination of in-band optical noise in optical telecommunication applications. More specifically, the invention relates to the determination of non-ASE optical noise on optical telecommunication links.

BACKGROUND OF THE ART

The Optical Signal-to-Noise Ratio (OSNR) is a conventional measure of the quality of a signal carried by an optical telecommunication link. Under normal and proper operating conditions, the OSNR of an optical communication link is typically high, often in excess of 15 dB or 20 dB, or even greater. The dominant component of the noise in an optical communication link is typically unpolarized Amplified Spontaneous Emission (ASE) noise, which is a spectrally broadband noise source contributed by the optical amplifiers in the link.

Some methods exist for characterization of ASE noise on optical telecommunication signals based on an in-band analysis of the optical signal. Such methods include methods referred to as "polarization-nulling" methods (see J. H. Lee et al., "OSNR Monitoring Technique Using Polarization-Nulling Method", IEEE Photonics Technology Letters, Vol. 13, No. 1, January 2001) as well as variants thereof, and the methods referred to as "differential polarization response" methods (see International Patent Application Publication WO 2008/122123 A1 to Gariepy et al.; and WO 2011/020195 A1 to He et al., both applications being commonly owned by the Applicant).

Polarization-nulling methods exploit the fact that the signal peak is generally polarized whereas ASE noise is generally unpolarized. By means of a polarization controller disposed before a linear polarizer, the combination serving as polarization analyzer, it is possible to orthogonally align the polarization axis of the analyzer to the State Of Polarization (SOP) of the signal-under-test in order to find a condition where the signal peak is maximally suppressed. An optical spectrum trace is acquired while the signal peak is suppressed and reveals the in-band ASE noise within the optical-channel bandwidth.

Differential polarization response methods involve the polarization-sensitive detection of an optical spectrum with optical spectrum analyzer means, where two or more optical spectrum traces are acquired under different polarization analysis conditions. However, unlike polarization-nulling methods, the differential polarization response approach does not require that the polarized signal be suppressed or close to the electronic noise floor of the measurement instrument for any of the acquired optical spectrum traces. Instead, differential polarization response methods employ a mathematical discrimination of the signal peak from the in-band ASE noise in the acquired optical spectrum traces using calculations and a comparison between the acquired traces. This results in significantly less stringent requirements on both the polarization control of the signal-under-test and the quality of the Optical Spectrum Analyzer (OSA) components (e.g. polarization extinction ratio), and leads to a significantly reduced measurement time in comparison to polarization-nulling methods.

However, in addition to ASE noise, there are other optical sources of distortion that may be present and significant on optical telecommunication signals of advanced modulation formats for next generation high-speed networks. Any such optical component which imparts impairment on optical signals and which is not ASE-related will be herein referred to as "non-ASE optical noise".

For example, multilevel modulation is a key enabler to significantly improve the spectral efficiency of optical fiber links employing already existing optical amplifiers and fiber transmission lines. To this end, phase modulation, often combined with amplitude modulation, of an optical carrier is an attractive means to achieve such multibit-per-symbol transmission. In implementations using coherent detection, impairments arising from dispersion phenomena that are "linear" with respect to the electric field can be, in principle, completely compensated at the receiver using digital signal processing. However, coherent-detection approaches remain susceptible to optical Non-Linear Effects (NLEs), such as Cross-Phase Modulation (XPM), Self-Phase Modulation (SPM), and polarization cross-talk. In particular, XPM arising from adjacent or nearby "legacy" intensity-modulated signals (e.g. 10 Gbit/s OOK signals) may drastically impair phase-modulated coherent telecommunication signals. XPM manifests itself on propagating optical signals in the form of signal depolarization which may be confused with ASE noise in prior-art polarization-nulling and differential polarization response methods. Accordingly, it is useful to characterize and discriminate signal depolarization from ASE noise, especially on live systems, as NLE-type impairments are very system and in situ dependent.

Moreover, advanced modulation formats for next-generation high-speed networks are typically generated with transmitters comprising a continuous-wave (CW) light source and a modulator, usually based on multiple Mach-Zehnder Interferometers (MZIs). Such MZI devices, comprising modulation sections oriented with respect to a modulation axis, are normally optimized for operation with a particular SOP of the light input thereto, and deviations in the SOP of the input light, normally CW light, will generally degrade or otherwise alter the MZI modulation properties. Incident light having a linear SOP parallel to the modulation axis of the modulator will undergo a high degree of modulation to provide the modulated (normally data-carrying) signal, whereas light having an SOP orthogonal to the modulation axis will normally undergo a much lower degree of modulation, this non-modulated portion being termed herein "carrier leakage". The non-modulated carrier leakage may introduce some extra optical noise to the system receiver. Also, the non-modulated carrier leakage and the modulated signal are both substantially polarized and have mutually-orthogonal SOPs. Therefore, it is useful to measure and discriminate the carrier leakage from the modulated signal and/or from ASE noise for advanced signal-quality characterization.

Upon application of in-band OSNR measurement methods of the art, such as prior-art polarization-nulling methods and prior-art differential polarization response methods, non-ASE optical noise such as signal depolarization and carrier leakage may be confused with ASE noise, therefore leading to inappropriate characterization of the in-band noise superposed on the optical signal-under-test.

Accordingly, for advanced signal-quality characterization and OSNR measurement, there is a need for a method enabling characterization of non-ASE optical noise, such as signal depolarization and carrier leakage, on optical signals and/or allowing improved characterization of ASE noise that discriminates between ASE- and non-ASE optical noise on the signal-under-test.

SUMMARY

There is provided herein a method for determining a noise parameter characterizing an optical Signal-Under-Test (SUT) having a (polarized) signal contribution, an Amplified Spontaneous Emission (ASE) noise contribution and a non-ASE optical noise contribution, such as a carrier-leakage contribution or a depolarized-signal contribution, within an optical-signal bandwidth. The method comprises acquiring optical spectrum trace(s) of the SUT, discriminating at least the non-ASE optical noise contribution from the ASE-noise contribution using the optical spectrum trace(s) and/or a trace obtained from the optical spectrum trace(s); and determining the noise parameter using discriminated non-ASE optical noise contribution and/or the discriminated ASE-noise contribution.

The signal depolarization and the carrier leakage, referred to herein as "non-ASE optical noises", each exhibit some specific optical properties notably in optical spectral shape and polarization, which are different from that of the polarized data-carrying signal and the ASE-noise. These qualitative differences are exploited herein to discriminate the non-ASE optical noises from the polarized data-carrying signal and the ASE-noise in acquired optical spectrum traces. More specifically, embodiments described here are based on a polarization-sensitive spectrum analysis of the SUT to be characterized. Based on this analysis, at least the specific polarization properties of the non-ASE optical noise(s) are exploited to discriminate it (them) from others. The specific optical spectrum properties of the non-ASE optical noise(s) may also be exploited to complete the discrimination.

One aspect of the invention provides a method for determining a noise parameter characterizing an optical SUT having a signal contribution, an ASE-noise contribution and a non-ASE optical noise contribution within an optical-signal bandwidth. The method comprises: acquiring, for each of a number $n_{SOP}$ of varied state-of-polarization analysis conditions of the SUT, at least one polarization-analyzed optical spectrum trace; discriminating at least the non-ASE optical noise contribution from the ASE-noise contribution using the acquired polarization-analyzed optical spectrum traces and/or a trace obtained from the acquired polarization-analyzed optical spectrum traces; and determining the noise parameter characterizing the SUT using the discriminated non-ASE optical noise contribution and/or the discriminated ASE-noise contribution.

Another aspect of the invention provides a method for determining a noise parameter characterizing an optical SUT having a signal contribution, a carrier-leakage contribution and an ASE-noise contribution within an optical-signal bandwidth. The method comprises: acquiring at least one optical spectrum trace of the SUT; discriminating at least the carrier-leakage contribution from the ASE-noise contribution using the acquired optical spectrum trace(s) and/or a trace obtained from the acquired optical spectrum trace(s); and determining the noise parameter on the SUT using the discriminated carrier-leakage contribution and/or the discriminated ASE-noise contribution.

Yet another aspect of the invention provides a method for determining a noise parameter characterizing an optical SUT having a polarized-signal contribution, a depolarized-signal contribution and an ASE-noise contribution within an optical-signal bandwidth, the depolarized-signal contribution being at least partly imparted from a non-linear effect to be characterized. The method comprises: acquiring, for each of a number $n_{SOP}$ of varied state-of-polarization analysis conditions of the signal under test, at least one polarization-analyzed optical spectrum trace; discriminating at least the depolarized-signal contribution from the ASE-noise contribution using the acquired polarization-analyzed optical spectrum traces and/or a trace obtained from the acquired polarization-analyzed optical spectrum traces; and determining the noise parameter on the SUT using the discriminated depolarized-signal contribution and/or the discriminated ASE-noise contribution.

It should be understood that the methods described herein which discriminate non-ASE optical noise from the data-carrying signal and ASE noise may be employed to characterize a non-ASE optical noise per se on the SUT, but that it may alternately be employed to provide an improved characterization of the in-band ASE-noise on the SUT compared to the prior art methods by discriminating ASE-noise from non-ASE optical noise. Accordingly, the noise parameter to be characterized may either be an ASE-noise parameter or a non-ASE noise parameter.

It should be appreciated that the methods described herein are not limited to live (i.e. real data-carrying) channels, but that they may also be employed to characterize a dark channel, i.e. an optical telecommunication channel that is not carrying data. To this end, a probe signal may be propagated in the optical channel to be characterized by employing an optical test source at the transmitter end of the optical telecommunication link. At the receiver end or anywhere else on the optical link, the probe signal will typically undergo substantially the same ASE and non-ASE noise as if it were a data-carrying signal and characterization of the probe signal provides characterization of the optical telecommunication channel. Accordingly, in this specification, the optical signal referred to as the SUT encompasses both a data-carrying signal and a probe signal. In the case of a probe signal, characterization of the propagated probe signal, referred to as the SUT, provides a characterization of the optical telecommunication channel under test.

In this specification, the expression "trace" is not to be construed limitatively to data that is displayed graphically, but is intended to encompass data which is not displayed graphically but nonetheless used for any suitable purpose.

In this specification, (vacuum) wavelength, denoted λ, will often be used interchangeably with optical frequency, denoted ν. The relationship between a small optical-frequency difference, for instance within a narrow (e.g. 50-GHz) DWDM channel, and the corresponding small wavelength difference is nearly linear and well known.

In this specification, reference is made to the differential polarization response approach. It should be understood that this approach may correspond to the Passive Polarization-Induced Discrimination (PPID) approach as described in International Patent Application Publication WO 2008/122123 A1 to Gariépy et al. (commonly owned by the Applicant) and that the two nomenclatures refer to the same technique. The technique referred to as the "differential polarization response approach" also includes variants of the PPID approach including the approach referred to as the improved differential polarization response approach in International Patent Application Publication WO 2011/020195 A1 to He et al. (also commonly owned by the Applicant).

BRIEF DESCRIPTION OF THE DRAWINGS

It will be noted that throughout the appended drawings, like features are identified by like reference numerals.

DETAILED DESCRIPTION

Figure 1:
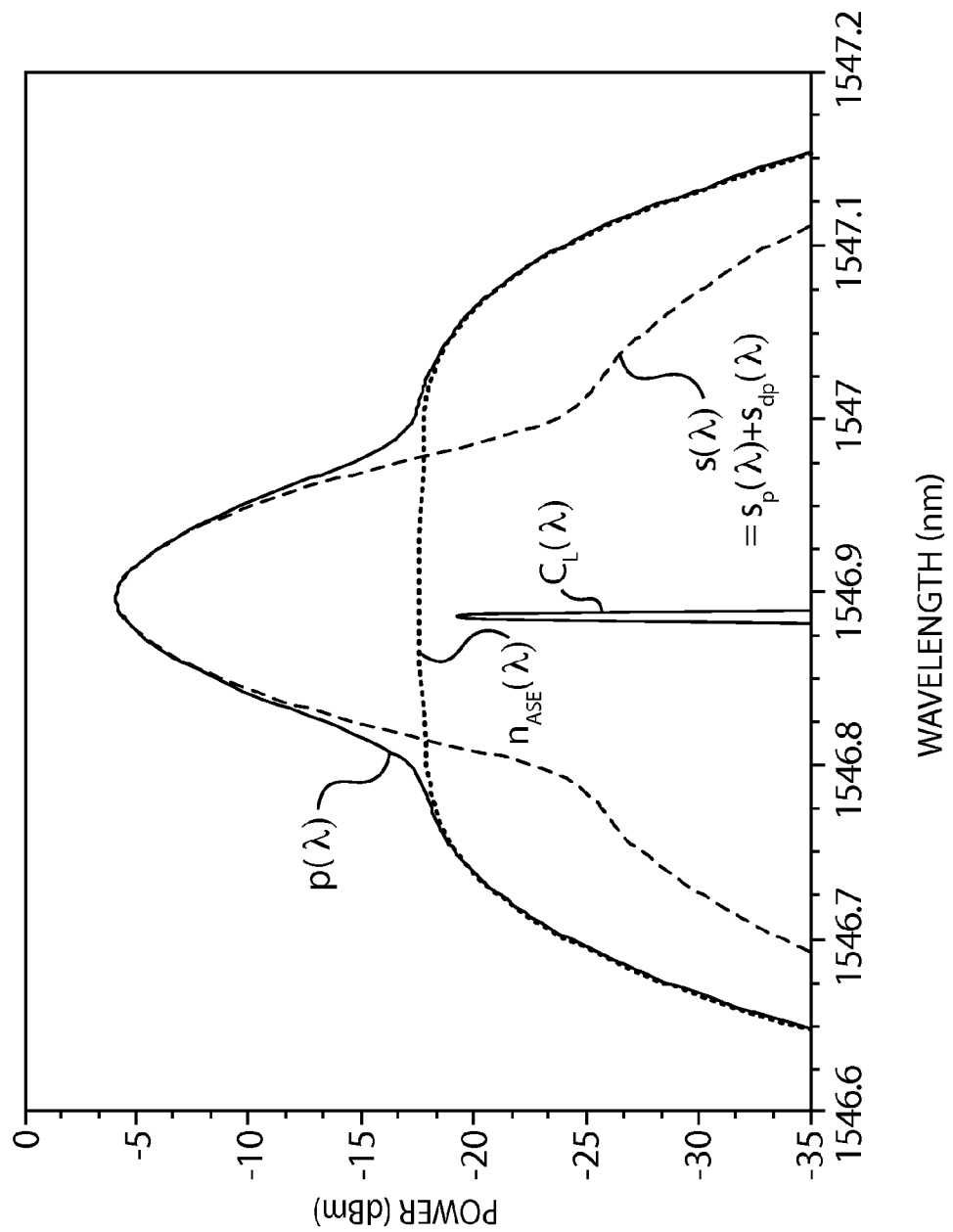
FIG. 1 is a graph illustrating the optical spectrum of an example Signal-Under-Test (SUT) to be characterized, along with the optical spectrum of its signal contribution, its ASE-noise contribution and its carrier-leakage contribution.

Now referring to FIG. 1, the methods and systems described herein relate to the characterization of an optical Signal-Under-Test (SUT) p which is used in optical telecommunications to transmit data over, for instance, a Dense Wavelength Division Multiplexing (DWDM) optical channel. Throughout the present description, the SUT p corresponds to one of the DWDM optical channels. In the optical-channel bandwidth of interest, the SUT p generally comprises a modulated signal contribution s arising from the data-carrying signal, and an Amplified Spontaneous Emission (ASE-) noise contribution $n_{ASE}$ arising from ASE noise of optical amplifiers in the optical transmission system. As explained hereinbefore, the SUT p may also comprise a non-modulated carrier-leakage contribution $c_L$ which may arise from an imperfect modulation at the transmitter. FIG. 1 shows the optical spectrum p(λ) of an example SUT p, along with the optical spectrum of its signal contribution s(λ), the optical spectrum of its ASE-noise contribution $n_{ASE}(\lambda)$ and the optical spectrum of its carrier-leakage contribution $c_L(\lambda)$, such that:

$$p(\lambda) = s(\lambda) + n_{ASE}(\lambda) + c_L(\lambda), \quad (1)$$

and $p = \int_{CBW} p(\lambda)$,
$s = \int_{CBW} s(\lambda)$,
$n_{ASE} = \int_{CBW} n_{ASE}(\lambda)$,
$c_L = \int_{CBW} c_L(\lambda)$,
and where CBW is the channel bandwidth of interest.

When multiple optical signals are transmitted through an optical fiber, the State-Of-Polarization (SOP) of one signal may be influenced by the other signals. The change is caused by the optical Kerr effect, also known as "nonlinear birefringence", which has a different magnitude for parallel and perpendicular optical electric-field components. In a Dense Wavelength Division Multiplexing (DWDM) system, the XPM-induced NLE gives rise to a rapid change of SOP on each DWDM signal. Such a nonlinear polarization effect results in a time-dependent "scrambling" of the SOP on a time scale shorter than a symbol period. This leads to an apparent partial depolarization of the (data-carrying) signal contribution of the SUT, referred to herein as "NLE-induced signal depolarization".

In addition to NLE-induced signal depolarization, Polarization Mode Dispersion (PMD) in the optical link can partially depolarize the signal contribution detected by the Optical Spectrum Analyzer (OSA). PMD is defined as the average over optical frequency of the Differential Group Delay (DGD), whose value generally varies as a function of wavelength. PMD generally leads to a variation of the SOP of the signal as a function of wavelength. Since the OSA Resolution BandWidth (RBW) is not infinitesimally small, the signal SOP can vary across this small but non-zero RBW. For instance, depending upon the SOP of the signal, a DGD of 4 ps may lead to an apparent 1% depolarization of the signal contribution as detected with an OSA having a RBW of 50 pm. Hence, in contrast with the "temporal" NLE-induced polarization scrambling, PMD may lead to an optical-frequency-dependent SOP variation which manifests itself on the SUT, depending upon the SOP of the signal, as a depolarization of the signal contribution, referred to herein as "PMD-related signal depolarization".

Equation (1) also applies in the presence of signal depolarization, comprising either or both of NLE-induced signal depolarization and PMD-related signal depolarization. The signal contribution s(λ) can be decomposed into a polarized-signal contribution $s_p(\lambda)$ and a depolarized-signal contribution $s_{dp}(\lambda)$, that is:

$$s(\lambda)=s_p(\lambda)+s_{dp}(\lambda)=(1-\xi)s(\lambda)+\xi s(\lambda) \quad (2)$$

where ξ is the coefficient of signal depolarization, such that $\xi=s_{dp}(\lambda)/s(\lambda)$ and $s_{dp}(\lambda)=\xi s(\lambda)$.

The depolarized-signal $s_{dp}(\lambda)$ can be expressed in turn as:

$$S_{dp}(\lambda)=S_{dp}(\lambda)_{NLE}+S_{dp}(\lambda)_{PMD}=\xi_{NLE}s(\lambda)+\xi_{PMD}s(\lambda) \quad (3)$$

where $\xi_{NLE}$ and $\xi_{PMD}$ are respectively coefficients of NLE- and PMD-related signal depolarization, such that $\xi=\xi_{NLE}+\xi_{PMD}$. $s_{dp}(\lambda)_{NLE}$ and $s_{dp}(\lambda)_{PMD}$ corresponding respectively to an NLE-induced depolarized-signal contribution $s_{dp\text{-}NLE}$ and a PMD-related depolarized-signal contribution $s_{dp\text{-}PMD}$.

The carrier-leakage contribution $C_L$, the depolarized-signal contribution $S_{dp}$, the NLE-induced depolarized-signal contribution $S_{dp\text{-}NLE}$ and the PMD-related depolarized-signal contribution $S_{dp\text{-}PMD}$ each represent a non-ASE noise contribution.

An optical spectrum trace of the SUT p, acquired by an OSA, represents the SUT p convolved with the filter spectral response of the OSA f(λ). The optical spectrum trace P(λ) is thus the spectrally-resolved optical power of the SUT p. Within the bandwidth corresponding to the channel bandwidth CBW, the optical spectrum trace P(λ) includes a signal contribution S(λ), an ASE-noise contribution $N_{ASE}(\lambda)$ and a carrier-leakage contribution $C_L(\lambda)$, which appear as being merged in the optical spectrum trace P(λ).

$$P(\lambda)=p(\lambda)*f(\lambda) \quad (4a)$$

$$P(\lambda)=[s(\lambda)+n_{ASE}(\lambda)+c_L(\lambda)]*f(\lambda)=S(\lambda)+N_{ASE}(\lambda)+C_L(\lambda) \quad (4b)$$

where "*" denotes a convolution operation.

Again, the signal contribution S(λ) may be decomposed into a polarized-signal contribution $S_p(\lambda)$ and a depolarized-signal contribution $S_{dp}(\lambda)$, that is:

$$S(\lambda)=S_p(\lambda)+S_{dp}(\lambda)=(1-\xi)S(\lambda)+\xi S(\lambda) \quad (5)$$

and $$S_{dp}(\lambda)=S_{dp}(\lambda)_{NLE}+S_{dp}(\lambda)_{PMD}=\xi_{NLE}S(\lambda)+\xi_{PMD}S(\lambda) \quad (6)$$

The methods and systems described herein are used to discriminate the (polarized) signal contribution S(λ) from the ASE-noise contribution $N_{ASE}(\lambda)$ and a non-ASE optical noise contribution $C_L(\lambda)$ and/or $S_{dp}(\lambda)$ in the optical spectrum trace P(λ) in order to determine one or more noise parameters of the SUT. The instrument noise associated with the detection system itself, namely the OSA, on the acquired optical spectrum trace P(λ) is considered to contribute negligibly to the observed optical noise.

FIG. 1 shows a single optical signal p within its corresponding optical channel, but in general other e.g. DWDM optical channels also share the optical spectrum (e.g. telecom C band), each channel carrying one optical signal (not shown). Typically, the other optical signals are present in the optical spectrum on both sides of the optical signal p.

A DWDM optical channel is specified as a spectral bandwidth over which an optical signal propagating through the link exhibits minimal loss, i.e. the channel bandwidth, allocated for the transmission of an optical signal in a WDM transmission scheme. The optical-signal bandwidth is defined as the actual width of the signal peak, i.e. the bandwidth over which the signal contribution is non negligible. The channel bandwidth may be larger than or just as large as (or even narrower than) the signal bandwidth, depending on the density of the DWDM channels, the effective bandwidth of the optical channel, and the signal transmission rate for a given transmission scheme.

The depolarized-signal contribution $S_{dp}(\lambda)$ exhibits a different spectral shape than that of the ASE-noise contribution $N_{ASE}(\lambda)$, since $S_{dp}(\lambda)$ follows the spectral shape of the signal contribution S(λ) whereas the ASE-noise contribution $N_{ASE}(\lambda)$ is substantially uniform at least in the central area of the optical-signal bandwidth, assuming that f(λ) has a RBW that is narrower than that of the signal contribution S(λ), which is generally the case. For example, the optical-signal bandwidth (determined by the signal baud) for high-speed networks (40G, 100G or higher) generally exceeds 10 GHz (even with advanced multi-level modulation formats), and current commercial field-deployable OSAs, such as models FTB-5240BP and FTB-5240S-P manufactured and marketed by EXFO Inc., have typical RBWs respectively of approximately 4 and 8 GHz in the (C-band) wavelength region of most DWDM systems. The depolarized-signal contribution $S_{dp}(\lambda)$ and the ASE-noise contribution $N_{ASE}(\lambda)$ have similar polarization properties, that is both are depolarized.

The carrier-leakage contribution $C_L(\lambda)$ also has some specific optical properties, notably both its optical spectral shape and polarization, which are different from that of the modulated signal contribution S(λ) and the ASE-noise contribution $N_{ASE}(\lambda)$. The SOP of the carrier leakage $C_L$ is approximately orthogonal to the SOP of the signal contribution S. As shown in FIG. 1, since the carrier leakage $C_L$ is non-modulated or modulated only to a limited degree, its corresponding optical spectrum shape $c_L(\lambda)$ usually closely resembles the carrier spectrum, which in turn is determined by the spectral line shape of the CW laser source employed in the transmitter, rather than that of the signal S.

These qualitative differences are exploited to discriminate the (polarized) signal contribution S(λ) from the ASE-noise contribution $N_{ASE}(\lambda)$ and the non-ASE optical noise contribution in acquired optical spectrum traces P(λ).

A first embodiment is described in which the dominant source of non-ASE optical noise on the SUT is a carrier-leakage contribution $C_L$. In this first embodiment, signal depolarization $S_p$ is assumed negligible and hence is not considered. The described method of this first embodiment is used to discriminate the carrier-leakage contribution $C_L$ from the data-carrying signal contribution S and the ASE-noise contribution $N_{ASE}$, in order to determine either or both an ASE-noise parameter, e.g. the ASE-only OSNR, or a non-ASE noise parameter, e.g. the carrier-leakage extinction ratio.

A second embodiment is then described in which the SUT manifests both a signal-depolarization contribution $S_{dp}$ and a carrier-leakage contribution $C_L$. Both non-ASE optical noise contributions ($C_L$ and $S_{dp}$) are then discriminated on acquired optical spectrum traces in order to determine either or both an ASE-noise parameter, e.g. the ASE-only OSNR, or a non-ASE optical noise parameter, e.g. a degree of signal depolarization parameter (i.e the complement of degree of polarization). Of course, it should be understood that the second embodiment may be simplified to the case where carrier-leakage is not present and where the only non-ASE optical noise to be evaluated is the signal depolarization.

In a third embodiment, the method of the second embodiment is applied to the case where a probe signal is propagated in an optical telecommunication channel that is not carrying a data-carrying signal, in order to characterize non-ASE optical noise on this channel.

Polarization-Sensitive Spectrum Analysis

Common to all three embodiments is the polarization-sensitive spectrum analysis, which exploits the differential polarization and spectral properties of the signal contribution S, the ASE-noise contribution and the non-ASE optical-noise contribution in order to discriminate between these. This common approach is then applied to each of the three embodiments used herein for performing the polarization-sensitive spectrum analysis. It should be appreciated that the polarization-sensitive spectrum analysis method described herein is only one example of a possible method and that multiple variants of this method exist such as, for example, methods described in International Patent Application Publication WO 2008/122123 A1 to Gariepy et al. and WO 2011/020195 A1 to He et al., both applications being commonly owned by the Applicant.

Figure 2:
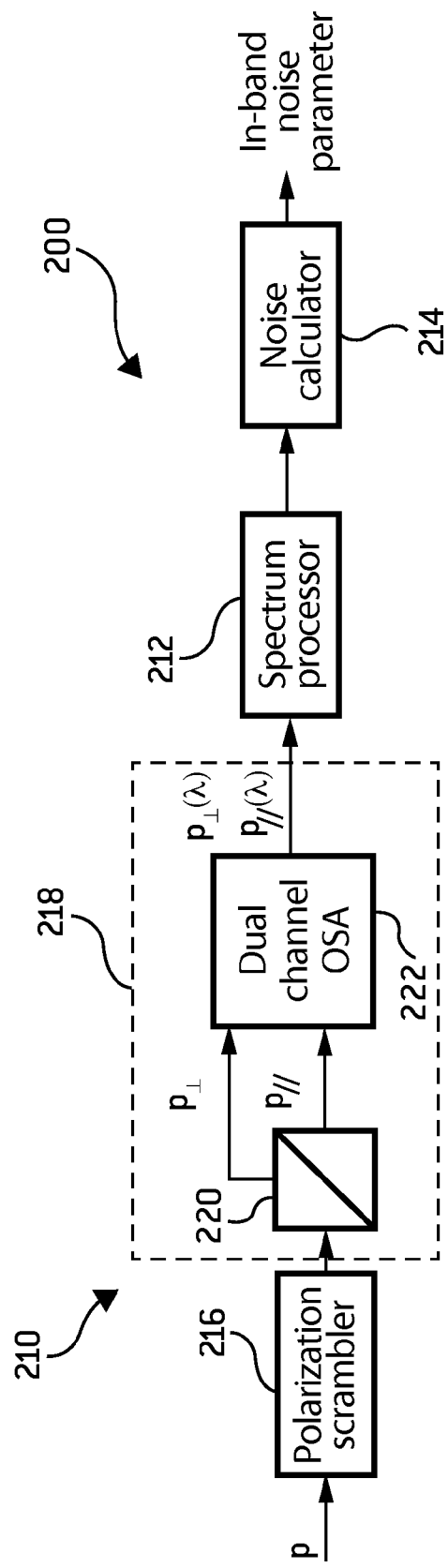
FIG. 2 is a block diagram showing the main parts of a system for determining a noise parameter or noise parameter(s) on a SUT by employing a polarization-sensitive spectrum analysis.

FIG. 2 illustrates the main components of a system 200 suitable for conducting the methods as described hereinafter, including the polarization-sensitive spectrum analysis. The system 200 receives a SUT p and comprises a Varied-SOP polarization-sensitive Optical Spectral Analyzer (VSOP-OSA) 210, a spectrum processor 212 and a noise calculator 214. The VSOP-OSA 210 comprises a polarization controller, in this case a polarization scrambler 216, placed before a polarization-diversity OSA 218 (see, for example, the polarization-diversity OSA described in commonly-owned U.S. Pat. No. 6,636,306 and commercially available as the EXFO FTB-5240 series of optical spectrum analyzers) comprising a combination of a polarization beam splitter (PBS) 220 and a dual channel Optical Spectrum Analyzer (OSA) 222. It should be appreciated that the optical spectrum analysis means is not limited to a polarization-diversity OSA but could encompass other polarization-sensitive spectrum analysis means providing polarimetric information on the SUT for example. For instance, in one embodiment, the polarization beam splitter 220 is replaced by a linear polarizer, such that only one polarization-analyzed sample $p_{//}$ is acquired for each condition of the polarization scrambler 216. The polarization beam splitter 220 is used to obtain two orthogonally-analyzed samples $p_\perp$ and $p_{//}$ of the input optical signal p. The polarization scrambler 216 is typically controlled by a control unit (not shown) which causes the SOP analysis conditions to be varied among acquisitions of pairs of samples $p_\perp$ and $p_{//}$.

The OSA 222 simultaneously acquires two polarization-analyzed optical spectrum traces ($P_\perp(\lambda)$ and $P_{//}(\lambda)$) respectively corresponding to samples $p_\perp$ and $p_{//}$. The case where the OSNR is null on one of the acquired traces, i.e. the signal is completely suppressed, is a special case but it should be emphasized that the methods described hereinafter do not require such a condition.

The spectrum processor 212 receives the two traces $P_\perp(\lambda)$, $P_{//}(\lambda)$ and discriminates the signal contribution s, the ASE-noise contribution $n_{ASE}$ and a non-ASE optical noise contribution (carrier-leakage contribution $c_L$ and/or depolarized-signal contribution $s_{dp}$). The noise calculator 214 evaluates an in-band noise parameter from the discriminated contributions. The ASE-only OSNR for example or any non-ASE optical noise parameter can then be calculated using the discriminated contributions.

It should be appreciated that the system illustrated in FIG. 2 is given as an illustrative example only of a suitable system for applying the methods described herein and that components or combination of components described may be replaced by any other components or combination of components which performs the functions required for their application.

Employing the VSOP-OSA 210 of FIG. 2, a plurality of pairs of mutually-orthogonal polarization-analyzed optical spectrum traces $P_{//}(\lambda)$, $P_\perp(\lambda)$ of the SUT p are acquired such that:

$$P(\lambda)=P_{sum}(\lambda)=P_{//}(\lambda)+P_\perp(\lambda)=p(\lambda)*f(\lambda) \qquad (7a)$$

$$P_{sum}(\lambda)=[s(\lambda)+n_{ASE}(\lambda)+c_L(\lambda)]*f(\lambda)=S(\lambda)+N_{ASE}(\lambda)+C_L(\lambda) \qquad (7b)$$

$$P_{sum}(\lambda)=S_{dp}(\lambda)+S_p(\lambda)+N_{ASE}(\lambda)+C_L(\lambda) \qquad (7c)$$

where $P_{sum}(\lambda)$ is the sum of optical spectrum traces $P_{//}(\lambda)$ and $P_\perp(\lambda)$, referred to herein as the "total optical spectrum trace", and where $S_p(\lambda)$, $S_{dp}(\lambda)$, $N_{ASE}(\lambda)$ and $C_L(\lambda)$ respectively correspond to optical spectrum traces of the polarized signal, the depolarized signal, the ASE-noise and the carrier-leakage contributions in $P_{sum}(\lambda)$ as would be acquired by an OSA having a filter function $f(\lambda)$.

Now, in order to perform a polarization-sensitive spectrum analysis of the SUT, a plurality of polarization-analyzed optical spectrum traces of the SUT should be acquired by varying the SOP analysis conditions of the VSOP-OSA 210. In accordance with the system 200 of FIG. 2, this is performed by generating, by means of the polarization scrambler 216, a number $n_{SOP}$ of different SOPs from the SOP of the SUT incident thereon. These different SOPs are then input into the polarization-diversity OSA 218 to provide a pair of mutually-orthogonal polarization-analyzed optical spectrum traces $P_{//}(\lambda)$ and $P_\perp(\lambda)$, whose spectral width encompasses at least the DWDM channel-under-test.

In order to perform polarization analysis of the SUT, an extrema trace, for example a maxima ratio trace $r_{max}(\lambda)$ or a minima ratio trace $r_{min}(\lambda)$ corresponding to the $n_{SOP}$ pairs of mutually-orthogonal polarization-analyzed optical spectrum traces $P_{//}(\lambda)$ and $P_\perp(\lambda)$ is calculated. In this embodiment, for each pair of said mutually-orthogonal polarization-analyzed optical spectrum traces $P_{//}(\lambda)$ and $P_\perp(\lambda)$, a ratio trace $r(\lambda)$ is obtained by dividing traces $P_{//}(\lambda)$ and $P_\perp(\lambda)$ ($r(\lambda)=P_{//}(\lambda)/P_\perp(\lambda)$). An extrema trace $r_{min}(\lambda)$ or $r_{max}(\lambda)$ corresponding to the $n_{SOP}$ acquisitions is then obtained by evaluating the minimum value $R_{min}(\lambda)$ or the maximum value $R_{max}(\lambda)$ for each of wavelengths $\lambda$ among the ratio traces $r(\lambda)$ as follows:

$$r_{min}(\lambda)=\min\{r(\lambda)=P_{//}(\lambda)/P_\perp(\lambda)\}_{SOP} \qquad (8a)$$

$$r_{max}(\lambda)=\max\{r(\lambda)=P_{//}(\lambda)/P_\perp(\lambda)\}_{SOP} \qquad (8b)$$

where $\min\{\bullet\}_{SOP}$ and $\max\{\bullet\}_{SOP}$ indicate "min-selecting" and "max-selecting" operations on the set of values for different SOPs at each individual wavelength. Accordingly, in this embodiment, the extrema trace $r_{min}(\lambda)$ or $r_{max}(\lambda)$ is a composite extrema trace in that it comprises extrema values evaluated at each acquisition wavelength.

If little or no PMD is present along the signal path, one may consider another embodiment which is easier to understand in terms of the significance of the extrema trace $r'_{min}(\lambda)$ or $r'_{max}(\lambda)$. In this embodiment, the extrema trace $r'_{min}(\lambda)$ or $r'_{max}(\lambda)$ is obtained by identifying the one of the ratio traces among the acquired $n_{SOP}$ pairs of optical spectra for which the signal peaks exhibits, respectively, a minimum or maximum. The extrema trace $r'_{min}(\lambda)$ then corresponds to the pair of mutually-orthogonal optical spectrum traces $P_{//}(\lambda)$, $P_\perp(\lambda)$ for which the SOP analysis condition (e.g. the axis of the analyzer defined by the polarization-controller/linear-polarizer combination) is the more closely aligned with the SOP of the signal, and thereby to the optical spectrum trace (say $P_{//}(\lambda)$) for which the signal contribution is most suppressed. In this case, this polarization-sensitive spectrum analysis may be compared to the polarization-nulling approach where the SOP is scrambled until the signal is completely suppressed. It should be emphasized, however, that the methods described herein are more general compared to the polarization-nulling approach, in that it is not required that the signal be substantially or completely suppressed in any of the polarization-analyzed mutually-orthogonal optical spectrum traces $P_{//}(\lambda)$, $P_{\perp}(\lambda)$. The non-perfect alignment of the SOP of the signal in the extrema trace $r_{min}(\lambda)$ or $r_{max}(\lambda)$ is compensated by the parameter E as described hereinbelow.

Herein, the extrema trace $r_{min}(\lambda)$ or $r_{max}(\lambda)$ is rather evaluated wavelength-by-wavelength in order to construct a composite extrema trace. Such construction of a composite extrema trace permits significant compensation for certain effects usually associated with signal impairments, notably PMD, which may otherwise lead to a wavelength-dependent error on the discriminated contributions.

Furthermore, one can undertake a "min-selecting" operation on the minimum ratio traces $r_{min}(\lambda)$ and the point-by-point multiplicative inverse of the maximum ratio trace $r_{max}(\lambda)$ as a function of wavelength to obtain a combined composite extrema ratio trace, viz:

$$r_{minmin}(\lambda) = \min\{r_{min}(\lambda); 1/r_{max}(\lambda)\}_\lambda \quad (9)$$

Any variation in the overall optical power in the channel from one acquired extrema-ratio trace to another may be compensated in data analysis by normalization using the corresponding total optical spectrum trace $P_{sum}(\lambda)$. In this way, one synthesizes (or "constructs") a min-selecting composite extrema optical spectral trace $P_{minmin}(\lambda)$, referred to herein as a "constructed composite extrema trace", as:

$$P_{minmin}(\lambda) = \frac{r_{minmin}(\lambda)}{1 + r_{minmin}(\lambda)} P_{sum}(\lambda) = \frac{P_{sum}(\lambda)}{1 + r_{maxmax}(\lambda)} \quad (10)$$

It should be appreciated that although the last two steps, corresponding to Equations (9) and (10), are useful especially for compensating variations of optical power from one acquisition to another, they are optional and, in other embodiments of polarization-sensitive spectrum analysis, one or the other may be omitted without departing from the general concept described herein.

The thereby-obtained extrema trace, which in this embodiment is the composite extrema optical spectral trace $P_{minmin}(\lambda)$, corresponds to an optical spectrum trace where the proportion of polarized-signal contribution $S_p(\lambda)$ is minimized. Of course, as previously mentioned, the herein-described polarization-sensitive spectrum analysis method does not require the signal to be suppressed in any of the acquired polarization-analyzed optical spectrum traces, and hence a portion of polarized-signal contribution will generally remain, such that:

$$P_{minmin}(\lambda) = 0.5 S_{dp}(\lambda) + \epsilon S_p(\lambda) + 0.5 N_{ASE}(\lambda) + (1-\epsilon) C_L(\lambda) \quad (11a)$$

$$P_{minmin}(\lambda) = 0.5 \xi S(\lambda) + \epsilon (1-\xi) S(\lambda) + 0.5 N_{ASE}(\lambda) + (1-\epsilon) C_L(\lambda) \quad (11b)$$

where $\epsilon$ is the coefficient of residual polarized-signal contribution $S_p(\lambda)$ in $P_{minmin}(\lambda)$.

The coefficient $\epsilon$ is generally composed of two contributions, i.e. $\epsilon_{SOP}$ and $\epsilon_{PBS}$, where $\epsilon = \epsilon_{SOP} + \epsilon_{PBS}$. The first contribution, $\epsilon_{SOP}$, arises from the fact that it is not required that the signal, more specifically the polarized-signal contribution $S_p(\lambda)$, be substantially or completely suppressed in any of the polarization-analyzed mutually-orthogonal optical spectrum traces $P_{//}(\lambda)$, $P_{\perp}(\lambda)$. The second contribution, $\epsilon_{PBS}$, comes from the inherent extinction-ratio limitation of the polarization beam splitter (for instance 220) employed to separate $P_{//}(\lambda)$ and $P_{\perp}(\lambda)$. It will be appreciated that in some cases, this latter contribution may be sufficiently small to be assumed null.

The non-perfect orthogonal alignment of the SOP of the polarized-signal contribution $S_p(\lambda)$ in the extrema trace $r_{min}(\lambda)$ is compensated by the coefficient E. In the same way, the SOP of the carrier-leakage contribution $C_L(\lambda)$, which is orthogonal to that of the polarized-signal contribution $S_p(\lambda)$, may not be perfectly aligned in the extrema trace $r_{min}(\lambda)$, resulting in the factor $(1-\epsilon)$ in Equations (11a) and (11b). When the number of SOP analysis conditions $n_{SOP}$ is at least about 50 (which yields $\epsilon < 0.01$), this latter non-perfect alignment is usually considered to not have a significant practical effect on the polarization-sensitive spectrum analysis and the characterization of non-ASE optical noise contributions. Consequently, the factor $(1-\epsilon)$ may be neglected in the following. Of course, in cases where this aforedescribed non-perfect alignment cannot be considered negligible, it remains possible to take it into account.

It should be noted that the aforedescribed prior-art polarization-nulling approach represents a special case of the polarization-sensitive spectrum analysis described herein, for which the $\epsilon$ parameter may be considered null. Such a condition may arise if the number of SOP analysis conditions $n_{SOP}$ is very high, so that, on at least one of the acquired optical spectrum trace, the SOP of the SUT, as generated by the polarization scrambler 216, is substantially aligned with the polarization beam splitter 220. However, the method described herein is more general and is also applicable to a reduced number of SOP analysis conditions $n_{SOP}$ for which the parameter $\epsilon$ cannot be assumed null or negligibly small.

The depolarized-signal contribution $S_{dp}(\lambda)$ is also depolarized, and hence half of this contribution appears in optical spectral trace $P_{minmin}(\lambda)$.

Here, for simplicity, the ASE-noise contribution $N_{ASE}(\lambda)$ is assumed to be substantially depolarized, resulting in also half of the ASE-noise contribution $N_{ASE}(\lambda)$ to show in optical spectral trace $P_{minmin}(\lambda)$. However, it should be noted that a possible slight polarization of the ASE noise, resulting in a DOP of 10% for example, would not have significant impact on the characterization of ASE and non-ASE optical noise contributions for practical OSNR values.

First Embodiment

A first embodiment is described with reference to FIG. 3 which shows an example of an optical spectrum trace $P_{sum}(\lambda)$ of a channel of a commercial 40G system, as acquired by a FTB-5240BP OSA by EXFO Inc. having a RBW of about 3.5 GHz, where the dominant source of non-ASE optical noise on the SUT is a carrier-leakage contribution $C_L$. Illustrated in FIG. 3 are the total optical spectrum trace $P_{sum}(\lambda)$, its data-carrying signal contribution $S(\lambda)$ and combined carrier-leakage and ASE-noise contributions $C_L(\lambda) + N_{ASE}(\lambda)$.

In this first embodiment, non-ASE noise is assumed to only include carrier leakage. Signal depolarization $S_{dp}$ is assumed negligible and is hence not considered. The method of this first embodiment is used to discriminate the carrier-leakage contribution $C_L$ from the data-carrying signal contribution S and the ASE-noise contribution $N_{ASE}$ in order to determine either or both of an ASE-noise parameter, e.g. the ASE-only OSNR, or a non-ASE noise parameter, e.g. the carrier-leakage extinction ratio.

Figure 3:
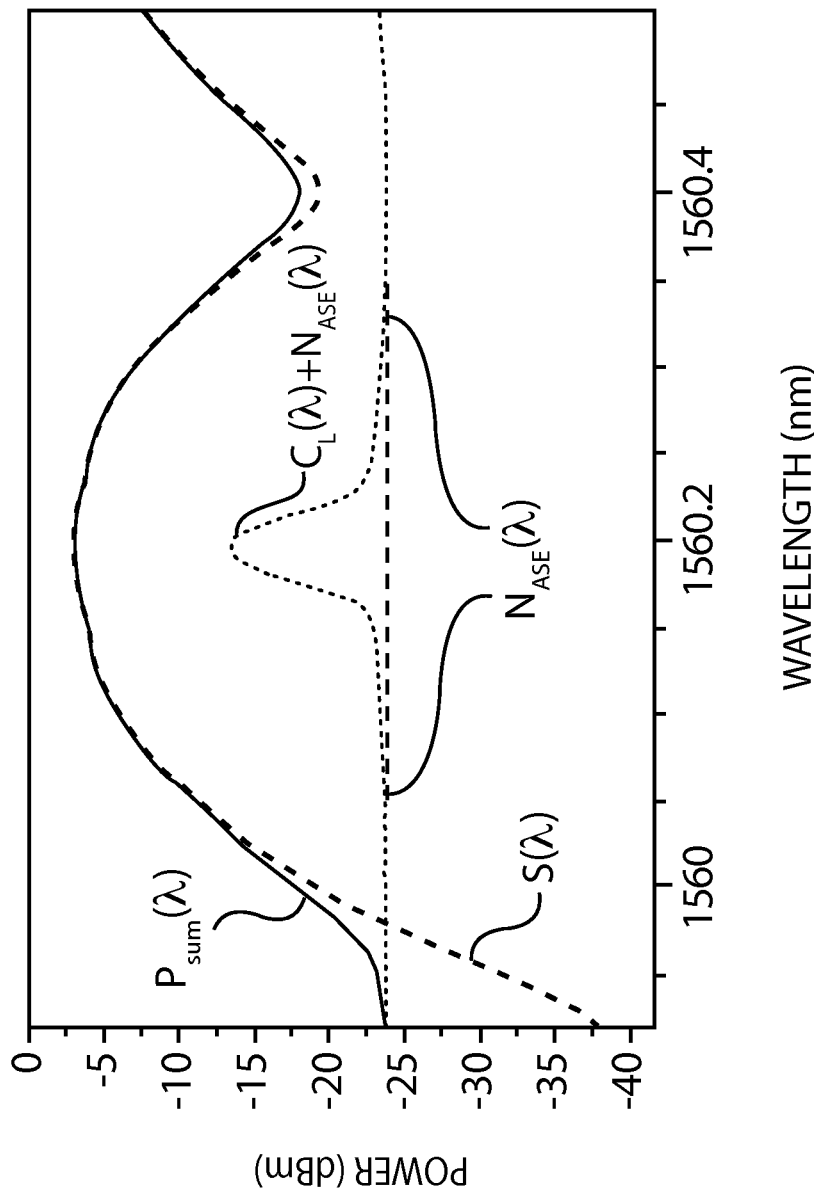
FIG. 3 is a graph of an optical spectrum trace of an example SUT exhibiting a modulated signal contribution $S(\lambda)$, a (non-modulated) carrier-leakage contribution $C_L(\lambda)$ and an ASE-noise contribution $N_{ASE}(\lambda)$.

From FIG. 3, it can be observed that:
A) The spectral shape of the signal contribution $S(\lambda)$ on acquired optical spectrum trace $P_{sum}(\lambda)$ is dominated by the optical spectrum of the modulated signal, a consequence of the signal bandwidth being much wider than the RBW of the OSA (40 GHz versus about 3.5 GHz);
B) The spectral shape of the carrier-leakage contribution $C_L(\lambda)$ on acquired optical spectrum trace $P_{sum}(\lambda)$ follows that of the filter function $f(\lambda)$ of the OSA (with a RBW of about 3.5 GHz), a consequence of the carrier-like, i.e. Dirac-delta-function-like optical spectrum of the carrier-leakage contribution $C_L(\lambda)$, which is much narrower than the RBW of the OSA (about 3.5 GHz); and
C) The spectral shape of the ASE-noise contribution $N_{ASE}(\lambda)$ is significantly different from both that of the signal $S(\lambda)$ and the carrier-leakage $C_L(\lambda)$ contribution. The spectral shape of the ASE-noise contribution $N_{ASE}(\lambda)$ may be considered to be substantially uniform over the channel bandwidth, i.e. in-band.

In addition to the spectral-shape differences, the respective SOPs and degrees of polarization of the signal $S(\lambda)$, the carrier-leakage $C_L(\lambda)$ and ASE-noise $N_{ASE}(\lambda)$ contributions are in general different, that is:
A) The signal $S(\lambda)$ and the carrier-leakage $C_L(\lambda)$ contributions are significantly polarized, but with mutually orthogonal SOPs; and
B) The ASE-noise contribution $N_{ASE}(\lambda)$ is substantially depolarized.

Figure 4:
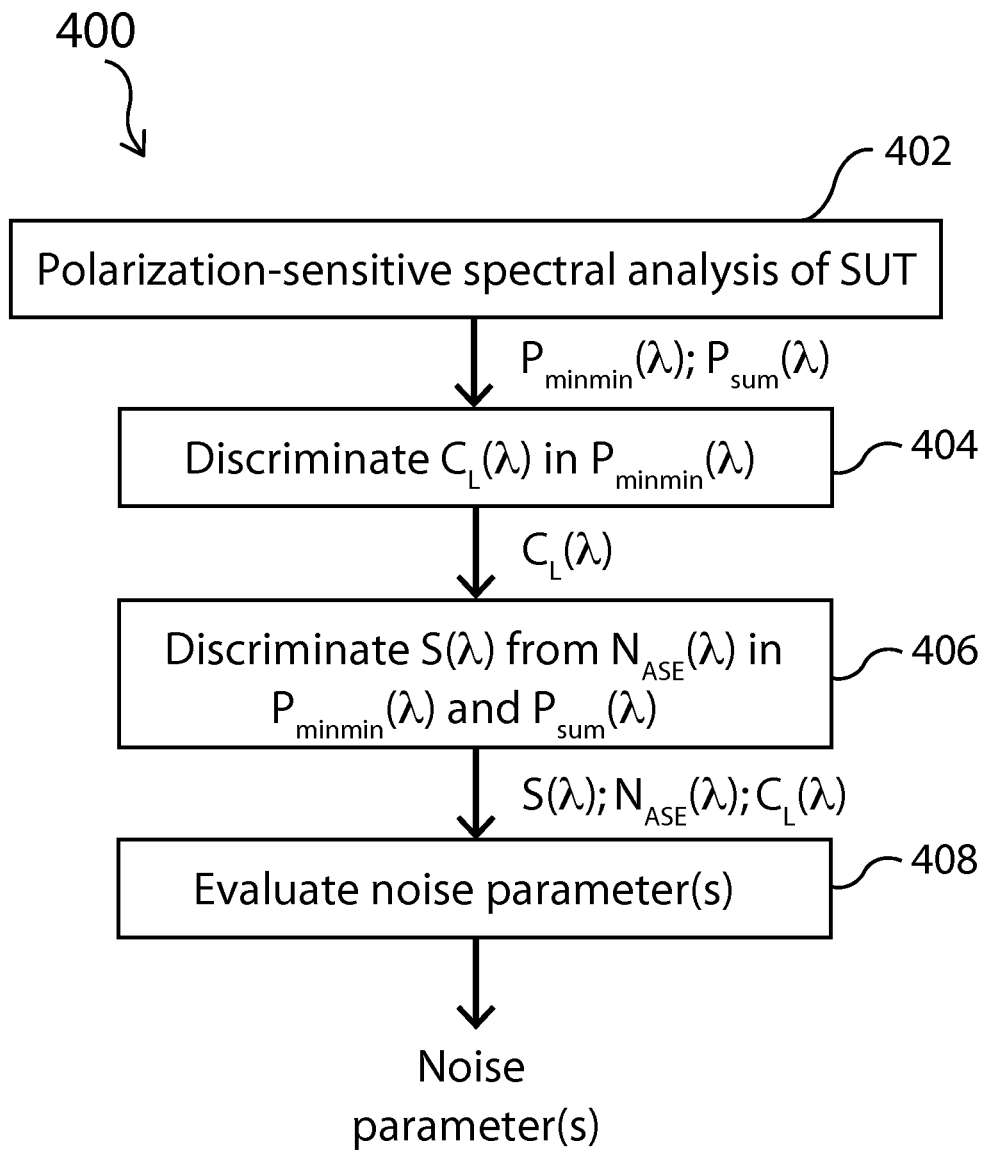
FIG. 4 is a flowchart illustrating a method for determining a noise parameter on a SUT having signal $S(\lambda)$, carrier-leakage $C_L(\lambda)$ and ASE-noise $N_{ASE}(\lambda)$ contributions, in accordance with a first embodiment.

FIG. 4 shows the method 400 of the first embodiment for determining a noise parameter on a SUT having signal $S(\lambda)$, ASE-noise $N_{ASE}(\lambda)$ and carrier-leakage $C_L(\lambda)$ contributions. In accordance with this method, the carrier-leakage contribution CO) may be discriminated from the signal $S(\lambda)$ and ASE-noise $N_{ASE}(\lambda)$ contributions by means of differential properties of spectral shape and polarization. In step 402, a polarization-sensitive spectrum analysis of the SUT is conducted. In step 404, the carrier-leakage contribution $C_L(\lambda)$ is discriminated in $P_{minmin}(\lambda)$. In step 406, the signal $S(\lambda)$ and ASE-noise $N_{ASE}(\lambda)$ contributions are also discriminated in $P_{minmin}(\lambda)$ and $P_{sum}(\lambda)$. Having discriminated all contributions, in step 408, the noise parameter(s) to be characterized are determined from at least one or a combination of the discriminated signal $S(\lambda)$, ASE-noise $N_{ASE}(\lambda)$ and carrier-leakage $C_L(\lambda)$ contributions. These steps are now described in more detail.

In step 402, a polarization-sensitive spectrum analysis of the SUT is conducted as described hereinabove. Step 402 may be implemented, for example, by employing the VSOP-OSA 210 of FIG. 2. As a result of the polarization-sensitive spectrum analysis, assuming no signal depolarization ($\xi=0$), we have:

$$P_{minmin}(\lambda)=\epsilon S(\lambda)+0.5 N_{ASE}(\lambda)+C_L(\lambda) \quad (12a)$$

$$P_{sum}(\lambda)=S(\lambda)+N_{ASE}(\lambda)+C_L(\lambda) \quad (12b)$$

In step 404, the carrier-leakage contribution $C_L(\lambda)$ is discriminated in $P_{minmin}(\lambda)$. Step 404 may be implemented, for example, by the spectrum processor 212 of FIG. 2.

Figure 5:
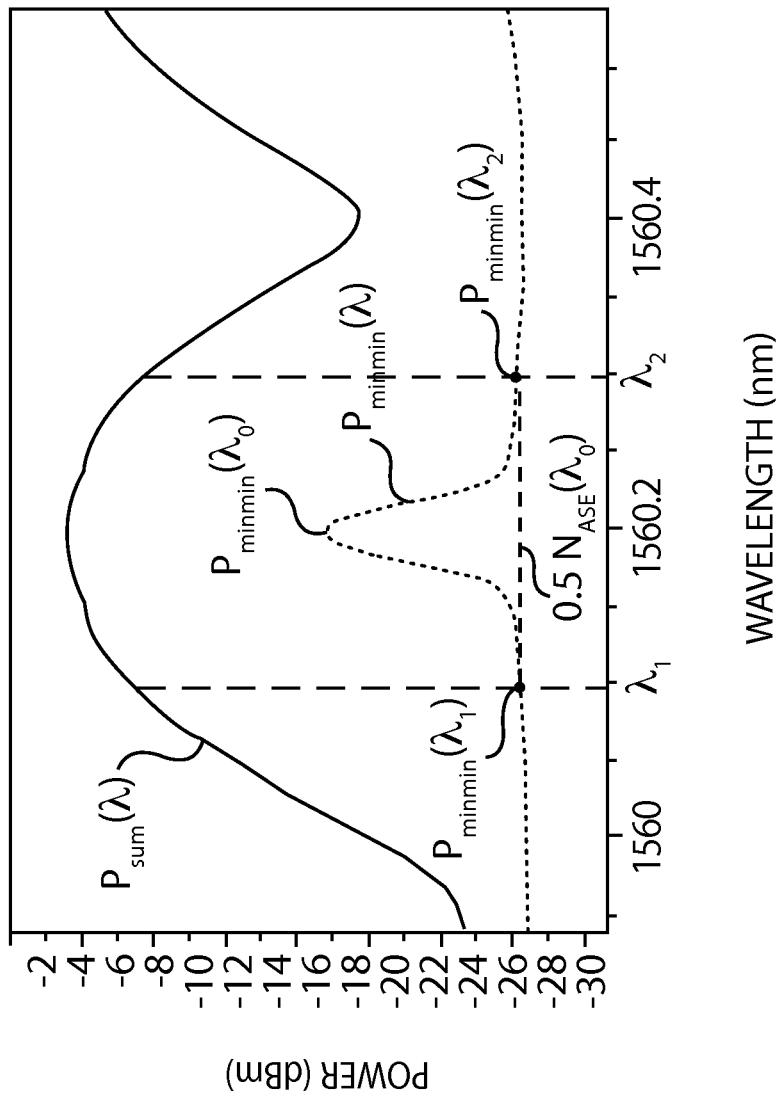
FIG. 5 is a graph of an optical spectrum trace of an example SUT illustrating a step of interpolating a minimum trace $P_{minmin}(\lambda)$ to discriminate the carrier-leakage contribution $C_L(\lambda)$ from the ASE-noise contribution $N_{ASE}(\lambda)$, in accordance with the first embodiment and in the case where there is absence of signal depolarization.

FIG. 5 illustrates step 404 in the case where the number $n_{SOP}$ is very large ($n_{SOP} \to \infty$) and the effect of the polarization beam splitter extinction ratio is assumed negligible ($\epsilon_{PBS} \to 0$). The coefficient E of residual $S(\lambda)$ in $P_{minmin}(\lambda)$ then approaches zero ($\epsilon \to 0$), i.e. E S ($\lambda$) is assumed negligible compared to 0.5 $N_{ASE}(\lambda)$. As shown in FIG. 5, in this case, the ASE-noise contribution $N_{ASE}(\lambda_0)$ may be estimated, at the peak wavelength $\lambda_0$ of $C_L(\lambda)$, by a linear interpolation on minima trace $P_{minmin}(\lambda)$, between "shoulder points" at wavelengths $\lambda_1$ and $\lambda_2$ selected, as explained hereafter, on each side of the carrier-leakage peak. This technique is herein referred to as "shoulder interpolation". The peak power of the power spectrum trace of the carrier leakage $C_L(\lambda)$ may then be estimated by:

$$C_L(\lambda_0)=P_{minmin}(\lambda_0)-0.5[P_{minmin}(\lambda_1)+P_{minmin}(\lambda_2)] \quad (13a)$$

As mentioned before, as the actual carrier-leakage contribution $c_L(\lambda)$ is approximately a Dirac-delta function, and is hence much narrower than the OSA filter function $f(\lambda)$, the total power of the carrier-leakage contribution may be determined from $C_L(\lambda_0)$, that is the peak power of the power spectrum trace of the carrier leakage $C_L(\lambda)$. The spectrum trace of the carrier leakage $C_L(\lambda)$ is then obtained by:

$$C_L(\lambda)=c_L(\lambda)*f(\lambda)=C_L(\lambda_0)\times f(\lambda) \quad (13b)$$

where $f(\lambda)$ is the normalized filter function of the OSA and where $\lambda_0$ is the peak wavelength of $C_L(\lambda)$. The carrier-leakage contribution may also rather be determined as:

$$C_L(\lambda)=P_{minmin}(\lambda)-0.5[P_{minmin}(\lambda_1)+P_{minmin}(\lambda_2)] \quad (14)$$

The carrier-leakage contribution can be then estimated with good accuracy by judicious choice of the shoulder-point wavelengths $\lambda_1$ and $\lambda_2$ where $C_L(\lambda)$ contributes negligibly to $P_{minmin}(\lambda)$. This is normally readily achievable since $C_L(\lambda)$ is typically much narrower than the DWDM channel bandwidth. For example, in the specific case of FIG. 5, the shoulder points are selected such that $\Delta\lambda=\lambda_2-\lambda_1=0.2$ nm, which corresponds to about 25 GHz at wavelengths around 1550 nm. Of course, the technique used to select the shoulder points may vary. For example, in another case, $\Delta\lambda$ could be chosen in an adaptive way as the –X-dB bandwidth (e.g. the –20-dB bandwidth with respect to the peak transmission) of the filter function $f(\lambda)$ corresponding to the OSA that is being used in the acquisition.

In step 406, the signal $S(\lambda)$ and ASE-noise $N_{ASE}(\lambda)$ contributions are discriminated in $P_{minmin}(\lambda)$ and $P_{sum}(\lambda)$. Step 404 may also implemented, for example, by the spectrum processor 212 of FIG. 2.

In the case of FIG. 5 where residual $S(\lambda)$ in $P_{minmin}(\lambda)$ is assumed negligible compared to the ASE-noise $N_{ASE}(\lambda)$ ($\epsilon \to 0$), the ASE-noise contribution $N_{ASE}(\lambda)$ may be determined, for example, by removing the carrier-leakage contribution $C_L(\lambda)$ from the minima $P_{minmin}(\lambda)$ and the total $P_{sum}(\lambda)$ traces. Accordingly, defining:

$$P'_{minmin}(\lambda)=P_{minmin}(\lambda)-C_L(\lambda), \text{ and} \quad (15a)$$

$$P'_{sum}(\lambda)=P_{sum}(\lambda)-C_L(\lambda) \quad (15b)$$

we have:

$$N_{ASE}(\lambda)=2*P'_{minmin}(\lambda) \quad (16a)$$

$$S(\lambda)=P'_{sum}(\lambda)-N_{ASE}(\lambda) \quad (16b)$$

Figure 6:
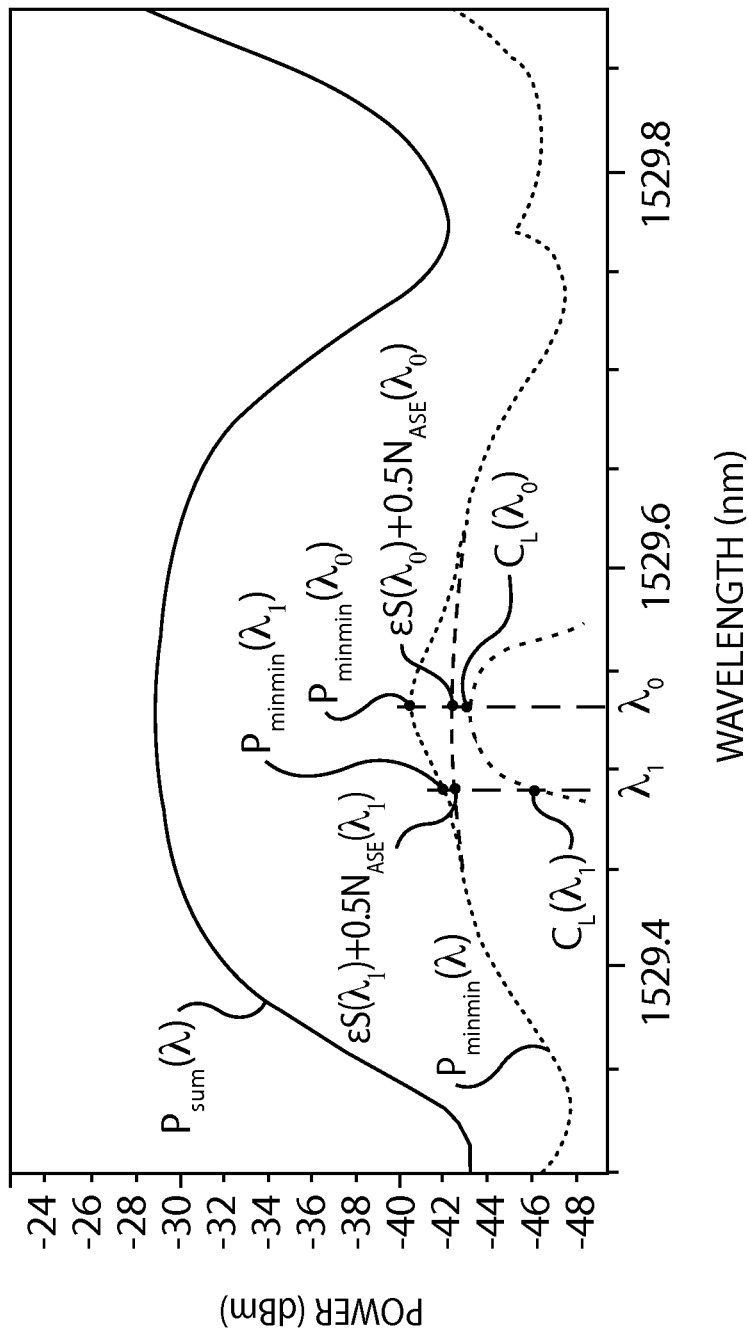
FIG. 6 is a graph of an optical spectrum trace of a SUT illustrating a step of interpolating a minimum trace $P_{minmin}(\lambda)$ to discriminate the carrier-leakage contribution $C_L(\lambda)$ from the ASE-noise contribution $N_{ASE}(\lambda)$, in accordance with the first embodiment and in the case where there is presence of signal depolarization.

FIG. 6 illustrates step 404 in the case where the coefficient $\epsilon$ cannot be neglected ($\epsilon \neq 0$). FIG. 6 shows an example of an optical spectrum trace acquired on a channel of a commercial 40G/10G mixed system for which the channel spacing is 50-GHz, as acquired by a FTB-5240BP OSA by EXFO Inc. having a RBW of about 3.5 GHz, for which there is significant residual signal contribution $\epsilon S(\lambda)$ in $P_{minmin}(\lambda)$ as well as some carrier-leakage contribution $C_L$. FIG. 6 illustrates the total optical spectrum trace $P_{sum}(\lambda)$ and the minima trace $P_{minmin}(\lambda)$.

In this case, the presence of residual signal contribution in $P_{minmin}(\lambda)$ renders it more difficult, although not impossible, to employ linear shoulder interpolation to discriminate the carrier-leakage contribution $C_L(\lambda)$ from $\epsilon S(\lambda)+0.5\ N_{ASE}(\lambda)$ in $P_{minmin}(\lambda)$. This difficulty arises from the presence of the non-flat residual signal contribution $\epsilon S(\lambda)$, which makes the method more sensitive to a proper choice of shoulder-point wavelengths $\lambda_1$ and $\lambda_2$. More sophisticated or advanced interpolation or curve-fitting approaches may then be employed to improve the accuracy.

Accordingly, the carrier-leakage contribution $C_L(\lambda)$ may be discriminated from $[\epsilon S(\lambda)+0.5\ N_{ASE}(\lambda)]$ by means of higher-order polynomial curve fitting using multiple, carefully chosen points comprising the composite minima trace $P_{minmin}(\lambda)$. Once $[\epsilon S(\lambda_0)+0.5\ N_{ASE}(\lambda_0)]$ is determined, $C_L(\lambda_0)$ may be found as:

$$C_L(\lambda_0) = P_{minmin}(\lambda_0) - [\epsilon S(\lambda_0) + 0.5 N_{ASE}(\lambda_0)]; \text{ and} \quad (17a)$$

$$C_L(\lambda) = C_L(\lambda_0) \times f(\lambda) \quad (17b)$$

Of course, other interpolation methods may be used as well for discriminating the carrier-leakage $C_L(\lambda)$. For example, the trace $P_{sum}(\lambda)$ may be used to estimate the shape of $[\epsilon S(\lambda)+0.5\ N_{ASE}(\lambda)]$. In this case, the shape of $P_{sum}(\lambda)$ is fitted over $P_{minmin}(\lambda)$ so as to interpolate $[\epsilon S(\lambda)+0.5\ N_{ASE}(\lambda)]$ in the spectral region where $C_L$ is non-negligible. $C_L(\lambda)$ is then found using Equations (17a) and (17b).

As another example, $C_L(\lambda)$ may also be found or discriminated from $[\epsilon S(\lambda)+0.5\ N_{ASE}(\lambda)]$ in $P_{minmin}(\lambda)$ based on a technique predicated upon both the slow variation (or substantial uniformity) of $[\epsilon S(\lambda)+0.5\ N_{ASE}(\lambda)]$ under $C_L(\lambda)$, as illustrated in FIG. 6, and the fact that $C_L(\lambda)$ has the same measured spectral shape as the filter function $f(\lambda)$ of the OSA, which is typically known or easily determined using a pre-calibration procedure or modeling. Referring to FIG. 6, the processing uses measurements made at two distinct wavelengths $\lambda_0$ and $\lambda_1$ (generally different from peak wavelength $\lambda_0$ and shoulder-point wavelength $\lambda_1$ of FIG. 5) that lie within the optical-signal bandwidth of the SUT and are generally positioned on the same side of the peak of the carrier-leakage contribution. By assuming a substantially uniform distribution of $[\epsilon S(\lambda)+0.5\ N_{ASE}(\lambda)]$ under the carrier-leakage peak and therefore a substantially equal level of $[\epsilon S(\lambda)+0.5\ N_{ASE}(\lambda)]$ at $\lambda_0$ and $\lambda_1$ (i.e. $\Delta=[\epsilon S(\lambda_0)+0.5\ N_{ASE}(\lambda_0)]-[\epsilon S(\lambda_1)+0.5\ N_{ASE}(\lambda_1)]\to 0$) on the trace $P_{minmin}(\lambda)$, we find:

$$P_{minmin}(\lambda_0) = C_L(\lambda_0) + [\epsilon S(\lambda_0) + 0.5 N_{ASE}(\lambda_0)] \quad (18a)$$

$$P_{minmin}(\lambda_1) = C_L(\lambda_1) + [\epsilon S(\lambda_1) + 0.5 N_{ASE}(\lambda_1)] \quad (18b)$$

and $C_L(\lambda_0)$ can be determined from:

$$C_L(\lambda_0) = \frac{P_{minmin}(\lambda_0) - P_{minmin}(\lambda_1)}{1 + \chi} \quad (19)$$

where $$\chi = \frac{C_L(\lambda_1)}{C_L(\lambda_0)} = \frac{f(\lambda_1)}{f(\lambda_0)} \quad (20)$$

For cases where $\Delta \neq 0$, the relative deviation on $C_L(\lambda_0)$ may be estimated by:

$$\delta C_L = \frac{\Delta \times C_L(\lambda_0)}{C_L(\lambda_0)} = \frac{\Delta}{C_L - C_L(\lambda_1)} \approx \varepsilon \frac{S(\lambda_0) - S(\lambda_1)}{C_L(\lambda_0) - C_L(\lambda_1)} \quad (21)$$

For example, in the case illustrated in FIG. 6, $\delta C_L$ is estimated to be less than 0.1 dB.

Having discriminated the carrier-leakage contribution $C_L(\lambda)$ in the case of FIG. 6, the signal $S(\lambda)$ and ASE-noise $N_{ASE}(\lambda)$ contributions should also be discriminated in accordance with step 406. To this end, the discriminated carrier-leakage contribution $C_L(\lambda)$ is first removed from both the minima $P_{minmin}(\lambda)$ and the total $P_{sum}(\lambda)$ traces, i.e.:

$$P'_{minmin}(\lambda) = P_{minmin}(\lambda) - C_L(\lambda) = \epsilon S(\lambda) + 0.5 N_{ASE}(\lambda) \quad (22a)$$

$$P'_{sum}(\lambda) = P_{sum}(\lambda) - C_L(\lambda) = S(\lambda) + N_{ASE}(\lambda) \quad (22b)$$

Methods known as differential polarization response methods and more specifically the methods described in International Patent Application Publication WO 2011/020195 A1 to He et al. (commonly owned by the Applicant) may then be applied to $P'_{minmin}(\lambda)$ and $P'_{sum}(\lambda)$ to discriminate the signal $S(\lambda)$ from the ASE-noise $N_{ASE}(\lambda)$ contribution. For example:

$$S(\lambda) = \frac{P'_{sum}(\lambda) - 2P'_{minmin}(\lambda)}{1 - 2\epsilon} \quad (23a)$$

$$N_{ASE}(\lambda) = P'_{sum}(\lambda) - S(\lambda) \quad (23b)$$

where, as explained in more detail hereinafter, by assuming $\epsilon_{PBS} \ll \epsilon_{SOP}$ and an independent and uniform distribution of the SOPs on the Poincaré sphere in the polarization-sensitive spectrum analysis, $$\epsilon = \frac{1}{2(n_{SOP} + 1)} \quad (24)$$

Having discriminated all contributions, in step 408, the noise parameter(s) to be characterized, i.e. either or both an ASE-noise parameter, e.g. the ASE-only OSNR, or a non-ASE noise parameter, e.g. the carrier-leakage extinction ratio, is (are) calculated from at least one or a combination of the discriminated signal $S(\lambda)$, ASE-noise $N_{ASE}(\lambda)$ and carrier-leakage $C_L(\lambda)$ contributions. The thereby-determined noise parameter(s) are output for use, for example, in monitoring, maintenance or troubleshooting of a DWDM optical system. For example, the noise parameter(s) may be output by graphical display, by printing, by generating an electrical signal or by storage into memory for later retrieval. Other parameters may also be displayed or otherwise output in a graphical or numerical form. Step 408 may be implemented, for example, by employing the noise calculator 214 of FIG. 2.

An example of a noise parameter that can be determined and subsequently output is the ASE-only OSNR, as defined over a 0.1-nm resolution bandwidth:

$$ASE\text{-only } OSNR = 10\log_{10}\left(\frac{\int_{CBW} S(\lambda) d\lambda}{\frac{0.1\ nm}{ENBW} \int_{ENBW} N_{ASE}(\lambda) d\lambda}\right) \quad (25)$$

wherein ENBW designates the equivalent-noise bandwidth. Another example of noise parameter is the carrier-leakage extinction ratio, which may be defined, in dB units, as:

$$10\log_{10}\left(\frac{\int_{CBW} S(\lambda)d\lambda}{\int_{CBW} C_L(\lambda)d\lambda}\right) = 10\log_{10}\left(\frac{\int_{CBW} S(\lambda)d\lambda}{C_L(\lambda_0)}\right) \quad (26)$$

Of course, any other useful ASE-noise parameters and/or non-ASE noise parameters may also be determined and subsequently output.

It should be appreciated that the algorithm described herein for discriminating the ASE-noise contribution and the carrier-leakage contribution from the modulated signal contribution in the measured optical spectrum traces is only one example of a suitable algorithm. Other suitable algorithms may be employed for that purpose. For example, algorithms described in International Patent Application Publication WO 2011/097734 A1 to Gariépy et al. (commonly owned by applicant), may be adapted for discriminating the noise contribution from the carrier-leakage contribution in $P_{minmin}(\lambda)$ by employing $f(\lambda)$ in lieu of the reference trace.

In the embodiments described herein, the carrier leakage is obtained through an analysis performed on a minima trace of $n_{SOP}$ pairs of traces obtained with varied SOP analysis conditions of the SUT. It is however noted that, instead of using the minima trace, the carrier leakage may be obtained through the analysis of a maxima trace, which would be generally combined with the total-power optical spectrum trace of the SUT ($P_{sum}(\lambda)$).

In the embodiments described hereinabove, the carrier-leakage contribution is evaluated based on a combination of polarization and spectral analysis of the SUT. It is noted that such a polarization analysis would not adequately discriminate the carrier-leakage contribution from the other contributions in the case of polarization-multiplexed signals. Accordingly, in another embodiment, the carrier-leakage contribution is evaluated using only spectral analysis, i.e. based on the different spectral-shape properties between the signal contribution, the carrier-leakage contribution and the ASE-noise contribution. The carrier-leakage contribution is then evaluated without employing a polarization-based analysis. Such an approach becomes practicable especially when the carrier-leakage contribution is sufficiently significant to be readily detectable on any optical spectrum trace $P_{sum}(\lambda)$ of the SUT.

The presence of carrier leakage is detectable on the total power optical spectrum trace $P_{sum}(\lambda)$ of the SUT as a deformation of the optical signal at the carrier peak wavelength. Because the carrier-leakage contribution has a very narrow bandwidth and thus varies rapidly compared to the signal contribution and the ASE-noise contribution, the carrier-leakage contribution may be discriminated from the other contributions by applying to $P_{sum}(\lambda)$ one of the techniques described hereinabove as being applied to $P_{minmin}(\lambda)$ with reference to FIG. 6.

For example, in one embodiment, Equations (18a) to (20) may be modified as follows for cases where $[S(\lambda)+N_{ASE}(\lambda)]$ varies slowly (or is almost uniform) under $C_L(\lambda)$ and where $C_L(\lambda)$ has substantially the same measured spectral shape as the filter function $f(\lambda)$ of the OSA, which is known or easily determined using a pre-calibration procedure or modeling. Accordingly, when $\Delta=[S(\lambda_0)+N_{ASE}(\lambda_0)]-[S(\lambda_1)+N_{ASE}(\lambda_1)] \to 0$, we have:

$$P_{sum}(\lambda_0) = S(\lambda_0) + C_L(\lambda_0) + N_{ASE}(\lambda_0) \quad (27a)$$

$$P_{sum}(\lambda_1) = S(\lambda_1) + C_L(\lambda_1) + N_{ASE}(\lambda_1) \quad (27b)$$

$C_L(\lambda_0)$ can be obtained from:

$$C_L(\lambda_0) = \frac{P_{sum}(\lambda_0) - P_{sum}(\lambda_1)}{1 - \chi} \quad (28)$$

where $$\chi = \frac{C_L(\lambda_1)}{C_L(\lambda_0)} = \frac{f(\lambda_1)}{f(\lambda_0)}. \quad (29)$$

Second Embodiment

Figure 7:
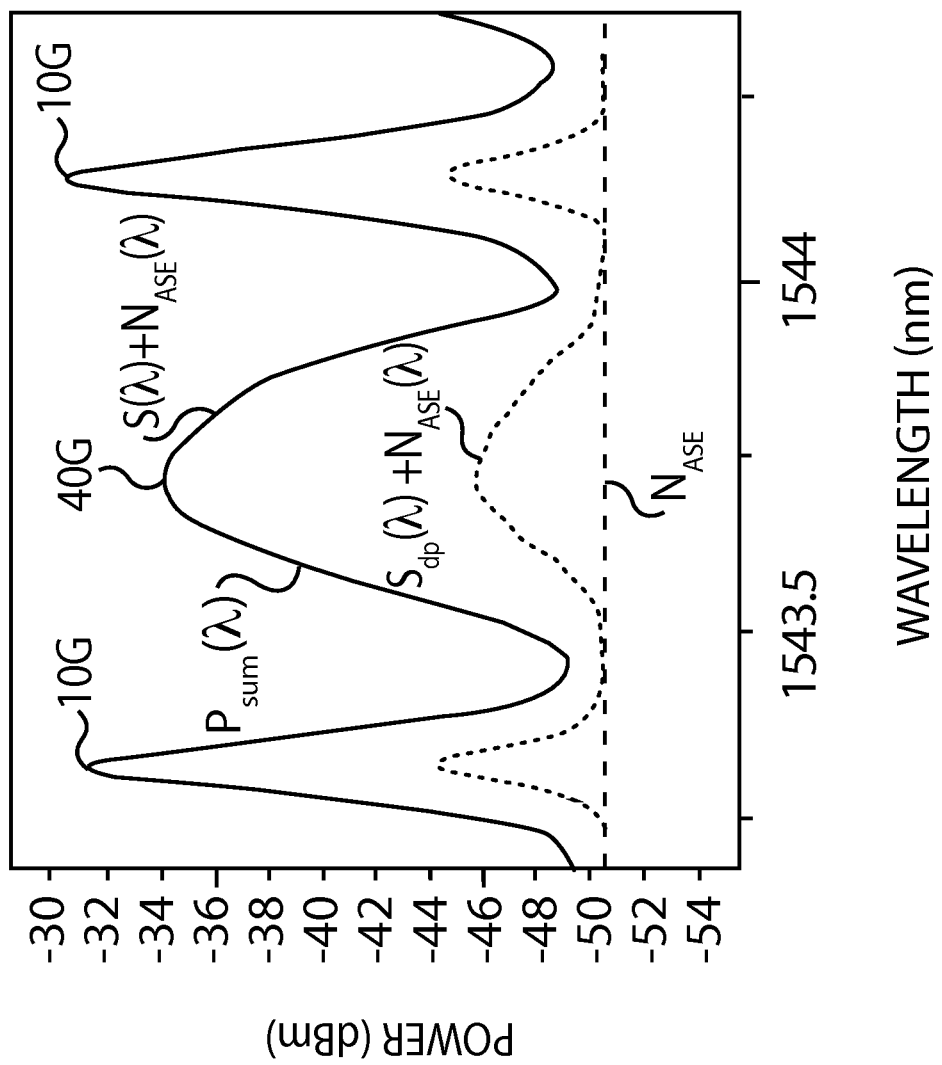
FIG. 7 is a graph of an optical spectrum trace of SUT exhibiting a modulated signal contribution $S(\lambda)$ with a depolarized signal contribution $S_{dp}(\lambda)$, as well as an ASE-noise contribution $N_{ASE}(\lambda)$.

A second embodiment is now described with reference to FIG. 7, which depicts an example of an optical spectrum trace $P_{sum}(\lambda)$ encompassing a few channels of a commercial 80-channel 10G/40G mixed system, as acquired by a FTB-5240BP OSA by EXFO Inc. having a RBW of about 3.5 GHz. The dominant source of non-ASE optical noise on this SUT is a depolarized-signal contribution $S_{dp}$, although a carrier-leakage contribution $C_L$ may also be present. FIG. 7 illustrates the total optical spectrum trace $P_{sum}(\lambda)$ and its depolarized part, i.e. $S_{dp}(\lambda) + N_{ASE}(\lambda)$.

The described method of this second embodiment is used to discriminate both non-ASE optical noise contributions ($C_L$ and $S_{dp}$) on acquired optical spectrum traces in order to determine either or both of an ASE-noise parameter, e.g. the ASE-only OSNR, or a non-ASE optical noise parameter, e.g. a degree of signal depolarization parameter. Of course, it will be understood that the second embodiment may be simplified to the case where carrier-leakage is not present and where the only non-ASE optical noise to be evaluated is the signal depolarization.

The optical spectrum shape and the SOP of the SUT are influenced by depolarization induced by either or both of NLEs or PMD. As explained hereinabove, depolarized-signal $S_{dp}$, polarized signal $S_p$, ASE-noise $N_{ASE}$ and carrier-leakage $C_L$ contributions have different spectral-shape and polarization properties that may be exploited to mutually discriminate them in acquired optical spectrum traces. To this end, the method of the second embodiment employs polarization-sensitive spectrum analysis such as described hereinabove.

Figure 8:
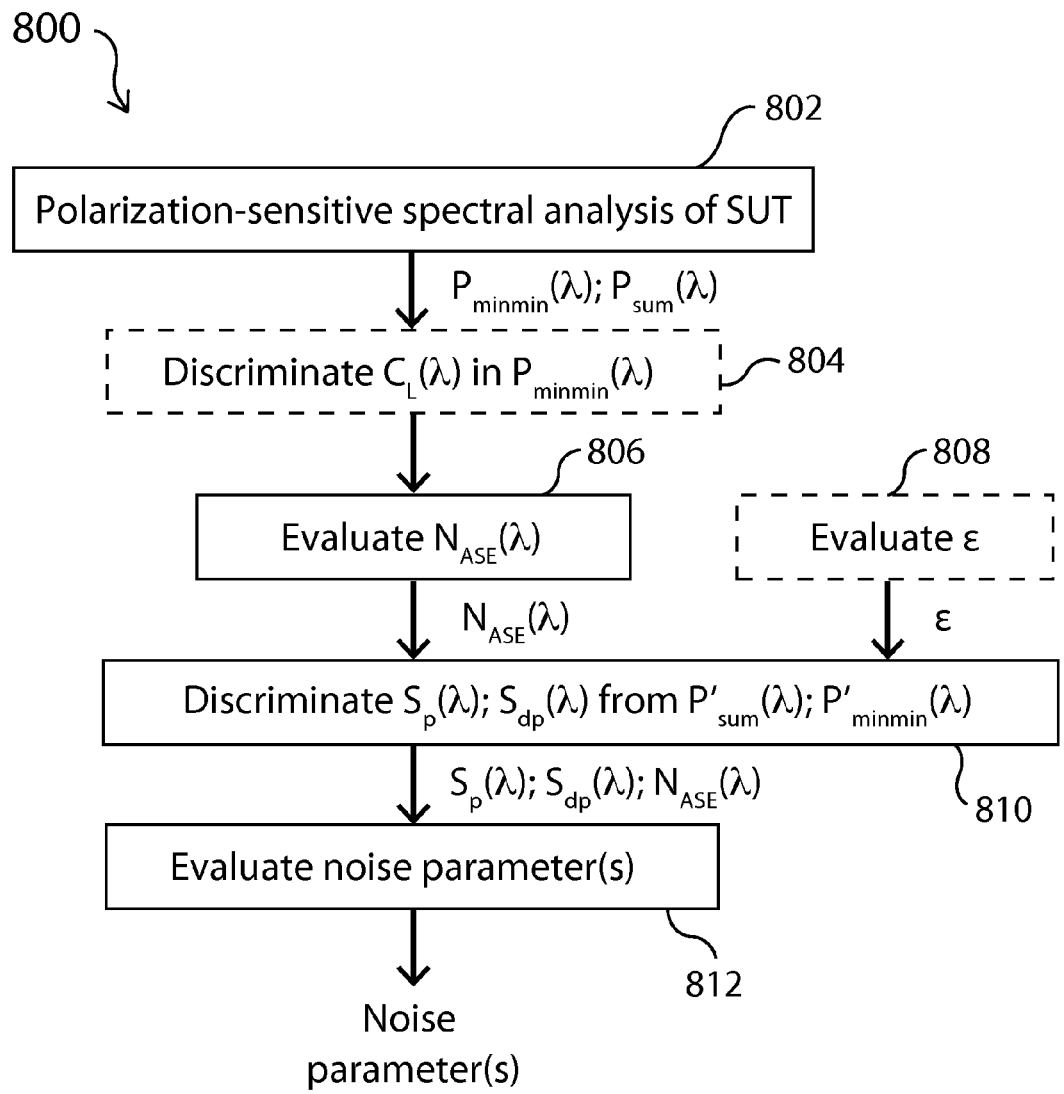
FIG. 8 is a flowchart illustrating a method for determining a noise parameter on a SUT having polarized-signal $S_p(\lambda)$, depolarized-signal $S_{dp}(\lambda)$, carrier-leakage $C_L(\lambda)$ and ASE-noise $N_{ASE}(\lambda)$ contributions, in accordance with a second embodiment.

FIG. 8 shows the method 800 of the second embodiment for determining a noise parameter on a SUT having depolarized-signal $S_{dp}(\lambda)$, polarized-signal $S_p(\lambda)$, ASE-noise $N_{ASE}(\lambda)$ and carrier-leakage $C_L(\lambda)$ contributions. In accordance with this method, the carrier-leakage $C_L(\lambda)$ and depolarized-signal $S_{dp}(\lambda)$ contributions may be discriminated from the polarized-signal $S(\lambda)$ and ASE-noise $N_{ASE}(\lambda)$ contributions by means of differential properties of spectral shape and polarization. In step 802, a polarization-sensitive spectrum analysis of the SUT is conducted. In step 804, the carrier-leakage contribution $C_L(\lambda)$ is discriminated in $P_{minmin}(\lambda)$ and subtracted from $P_{minmin}(\lambda)$ and $P_{sum}(\lambda)$ to yield $P'_{minmin}(\lambda)$ and $P'_{sum}(\lambda)$, the latter being equivalent to $P_{minmin}(\lambda)$ and $P_{sum}(\lambda)$ but exempt of any carrier-leakage contribution $C_L(\lambda)$. In step 806, the ASE-noise contribution $N_{ASE}(\lambda)$ is discriminated in either $P'_{minmin}(\lambda)$ or $P'_{sum}(\lambda)$. In step 808, the coefficient $\epsilon$ is evaluated if necessary. In step 810, the depolarized-signal $S_{dp}(\lambda)$ and polarized-signal $S_p(\lambda)$ contributions are discriminated in $P'_{minmin}(\lambda)$ and $P'_{sum}(\lambda)$. Having discriminated all contributions, in step 812, the noise parameter(s) to be characterized is (are) determined from at least one or a combination of the discriminated depolarized-signal $S_{dp}(\lambda)$, polarized-signal $S_p(\lambda)$ and ASE-noise $N_{ASE}(\lambda)$ contributions. These steps are now described in more detail.

In step 802, a polarization-sensitive spectrum analysis of the SUT is conducted as described herein above. Step 802 may be implemented, for example, by employing the VSOP-OSA 210 of FIG. 2. As a result of the polarization-sensitive spectrum analysis, we have:

$$P_{minmin}(\lambda)=0.5S_{dp}(\lambda)+\epsilon S_p(\lambda)+0.5N_{ASE}(\lambda)+C_L(\lambda) \quad (30a)$$

$$P_{sum}(\lambda)=S(\lambda)+N_{ASE}(\lambda)+C_L(\lambda) \quad (30b)$$

In step 804, the carrier-leakage contribution $C_L(\lambda)$ is discriminated in $P_{minmin}(\lambda)$. Step 804 may be implemented, for example, by the spectrum processor 212 of FIG. 2. Step 804 is considered optional in that it may be omitted in cases where it is assumed that the carrier-leakage contribution $C_L(\lambda)$ is not significant compared to the other contributions and/or where it does not need to be specifically characterized.

In cases where the carrier-leakage contribution $C_L(\lambda)$ is to be discriminated, step 804 may be undertaken, for example, by means of higher-order polynomial curve fitting using multiple, carefully chosen, points on the composite minima trace $P_{minmin}(\lambda)$, as described hereinabove with reference to step 404 of the method of the first embodiment. This enables the trace underlying the carrier leakage to be estimated at the peak wavelength $\lambda_0$ of $C_L(\lambda)$, i.e. $P'_{minmin}(\lambda_0)=[0.5\,S_{dp}(\lambda_0)+\epsilon S_p(\lambda_0)+0.5N_{ASE}(\lambda_0)]$, and once $[0.5\,S_{dp}(\lambda_0)+\epsilon S_p(\lambda_0)+0.5\,N_{ASE}(\lambda_0)]$ is determined, $C_L(\lambda_0)$ may be found as:

$$C_L(\lambda_0)=P_{minmin}(\lambda_0)-[0.5S_{dp}(\lambda_0)+\epsilon S_p(\lambda_0)+0.5N_{ASE}(\lambda_0)]; \text{ and} \quad (31a)$$

$$C_L(\lambda)=C_L(\lambda_0)\times f(\lambda) \quad (31b)$$

Of course, the other example implementations of step 404 described hereinabove may also be similarly adapted to discriminate the carrier-leakage contribution $C_L(\lambda)$ in $P_{minmin}(\lambda)$ in presence of depolarized-signal contribution $S_{dp}(\lambda)$.

Having now discriminated the carrier-leakage contribution $C_L(\lambda)$, this contribution is subtracted from $P_{minmin}(\lambda)$ and $P_{sum}(\lambda)$ to yield $P'_{minmin}(\lambda)$ and $P'_{sum}(\lambda)$ which are respectively equivalent to $P_{minmin}(\lambda)$ and $P_{sum}(\lambda)$ but free of carrier-leakage contribution $C_L(\lambda)$:

$$P'_{minmin}(\lambda)=P_{minmin}(\lambda)-C_L(\lambda)=\epsilon 0.5S_{dp}(\lambda)+\epsilon S_p(\lambda)+0.5N_{ASE}(\lambda) \quad (32a)$$

$$P'_{sum}(\lambda)=P_{sum}(\lambda)-C_L(\lambda)=S(\lambda)+N_{ASE}(\lambda) \quad (32b)$$

The following steps are thus performed on $P'_{minmin}(\lambda)$ and $P'_{sum}(\lambda)$.

In step 806, the ASE-noise contribution $N_{ASE}(\lambda)$ is discriminated in either $P'_{minmin}(\lambda)$ or $P'_{sum}(\lambda)$ based on the differential optical spectral shape properties of the ASE-noise contribution $N_{ASE}(\lambda)$ (which is normally substantially uniform in wavelength within the optical signal bandwidth) and the polarized-signal $S_p(\lambda)$ and depolarized-signal $S_{dp}(\lambda)$ contributions (which both follow the optical spectral shape of the signal contribution $S(\lambda)$). More specifically, in the central portion (e.g., within the –3-dB BW or the –10-dB BW) of optical spectrum traces of the SUT, i.e. $P'_{minmin}(\lambda)$ or $P'_{sum}(\lambda)$, the optical spectral shape of the polarized-signal $S_p(\lambda)$ and depolarized-signal $S_{dp}(\lambda)$ contributions varies with a much greater wavelength dependence than that of the ASE noise contribution $N_{ASE}(\lambda)$. Step 806 may be implemented, for example, by the spectrum processor 212 of FIG. 2.

Figure 9:
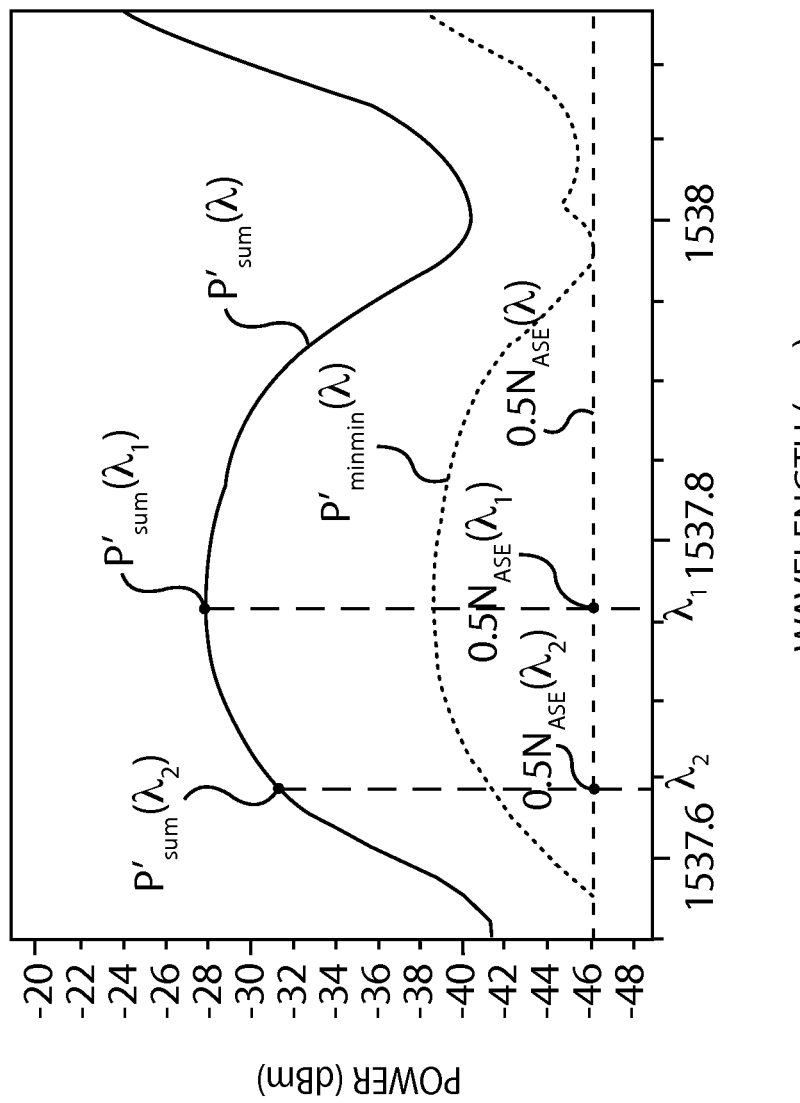
FIG. 9 is a graph of an optical spectrum trace of a SUT illustrating a step of discriminating the ASE-noise contribution in a minima trace $P_{minmin}(\lambda)$, in accordance with the second embodiment.

FIG. 9 illustrates step 806. It shows an example of an optical spectrum trace acquired by a FTB-5240BP OSA by EXFO Inc. having a RBW of about 3.5 GHz, on a channel of a commercial 40G/10G mixed system for which the channels are spaced by 50 GHz. A system configuration comprising such a channel plan is typically highly susceptible to NLE-induced signal depolarization, particularly when the 10G channels are modulated in amplitude. FIG. 9 illustrates the total optical spectrum trace $P'_{sum}(\lambda)$ and the composite minima trace $P'_{minmin}(\lambda)$.

The ASE-noise contribution $N_{ASE}(\lambda)$ is discriminated from depolarized-signal $S_{dp}(\lambda)$ and polarized-signal $S_p(\lambda)$ contributions in either $P'_{minmin}(\lambda)$ or $P'_{sum}(\lambda)$ based on a technique predicated upon both the slow variation (or substantial uniformity) of the ASE-noise contribution $N_{ASE}(\lambda)$ "under" (i.e. superposed upon) the depolarized-signal $S_{dp}(\lambda)$ and polarized-signal $S_p(\lambda)$ contributions.

From Equations (22a) and (22b), a differential optical spectrum trace $\Delta P(\lambda)$ is defined as:

$$\Delta P(\lambda)=P'_{sum}(\lambda)-2P'_{minmin}(\lambda)=(1-2\epsilon)(1-\xi)S(\lambda)=(1-2\epsilon)S_p(\lambda) \quad (33)$$

Accordingly, the differential optical spectrum trace $\Delta P(\lambda)$ is indicative of the optical spectrum shape of the signal contribution $S(\lambda)$ (or of the polarized-signal contribution $S_p(\lambda)$, which is the same). The so-obtained knowledge of the optical spectrum shape of the signal contribution $S(\lambda)$ and of the ASE-noise contribution $N_{ASE}(\lambda)$ allows for discrimination of the signal and ASE-noise contributions in $P'_{sum}(\lambda)$ or $P'_{minmin}(\lambda)$, as will now be described.

Referring to FIG. 9, the processing is carried out using measurements acquired at two distinct wavelengths $\lambda_1$ and $\lambda_2$ (generally different from $\lambda_1$ and $\lambda_2$ of FIGS. 5 and 6) that lie within the optical-signal bandwidth of the SUT and are generally positioned on the same side of the peak (i.e. spectral midpoint) of the signal contribution $S(\lambda)$. By properly selecting wavelengths $\lambda_1$ and $\lambda_2$ such that there is a substantially equal level of ASE-noise contribution $N_{ASE}(\lambda)$ at $\lambda_1$ and $\lambda_2$ (i.e. $\Delta=N_{ASE}(\lambda_1)-N_{ASE}(\lambda_2)\to 0$) and a different level of signal contribution in $P'_{sum}(\lambda)$ at $\lambda_1$ and $\lambda_2$ (i.e. $P'_{sum}(\lambda_1)\neq P'_{sum}(\lambda_2)$), for example $P'_{sum}(\lambda_2)/P'_{sum}(\lambda_1)=0.5$, as illustrated in FIG. 9), we find:

$$P'_{sum}(\lambda_1)=S(\lambda_1)+N_{ASE}(\lambda_1) \quad (34a)$$

$$P'_{sum}(\lambda_2)=S(\lambda_2)+N_{ASE}(\lambda_2) \quad (34b)$$

Now, based on Equation (33), $N_{ASE}(\lambda)$ can be determined from:

$$N_{ASE}(\lambda)=N_{ASE}(\lambda_1)=N_{ASE}(\lambda_2)=\frac{P'_{sum}(\lambda_1)-\chi P'_{sum}(\lambda_2)}{1-\chi} \quad (35a)$$

or, equivalently:

$$N_{ASE}(\lambda)=N_{ASE}(\lambda_1)=N_{ASE}(\lambda_2)=2\frac{P'_{minmin}(\lambda_1)-\chi P'_{sum}(\lambda_2)}{1-\chi} \quad (35b)$$

where $$\chi=\frac{\Delta P(\lambda_2)}{\Delta P(\lambda_1)}\approx\frac{S(\lambda_2)}{S(\lambda_1)} \quad (36)$$

It should be noted that the algorithm described herein for discriminating the noise contribution from the signal contribution in the measured optical spectrum traces is only one example of such an algorithm. Other suitable algorithms may be employed for that purpose. For example, algorithms described in International Patent Application Publication WO 2011/097734 A1 to Gariépy et al. (commonly owned by applicant), may be adapted for this discrimination by employing ΔP(λ) in lieu of the reference trace.

In step 808, the coefficient ϵ of residual polarized-signal contribution $S_p(\lambda)$ in $P_{minmin}(\lambda)$ is evaluated if necessary. Step 806 may also be implemented, for example, by means of the spectrum processor 212 of FIG. 2.

As mentioned hereinabove, the coefficient ϵ is generally comprised of two contributions, i.e. $\epsilon_{SOP}$ and $\epsilon_{PBS}$, where $\epsilon = \epsilon_{SOP} + \epsilon_{PBS}$. The first contribution, $\epsilon_{SOP}$, arises from the fact that it is not required that the signal, more specifically the polarized-signal contribution $S_p(\lambda)$, be substantially or completely suppressed in any of the polarization-analyzed mutually-orthogonal optical spectrum traces $P_{//}(\lambda)$, $P_{\perp}(\lambda)$. More specifically, $\epsilon_{SOP}$ is a function of the residual angle δ, in the Jones-vector domain, between the SOP of the polarized signal contribution $S_p(\lambda)$ and the polarization axis of the polarization beam splitter 220, such that $\epsilon_{SOP} = \sin^2 \delta$. The second contribution, $\epsilon_{PBS}$, comes from the inherent extinction-ratio limitation of the polarization beam splitter employed to separate $P_{//}(\lambda)$ and $P_{\perp}(\lambda)$.

As mentioned hereinabove, in the aforedescribed prior-art polarization-nulling approach which represents a special case of the polarization-sensitive spectrum analysis described herein, the ϵ parameter may be considered null assuming that the polarization scrambler/PBS combination provides a sufficiently large extinction ratio. In such a case, step 808 may be omitted and coefficient c set to zero.

As described in International Patent Application Publication WO 2011/020195 A1 to He et al. (commonly owned by applicant), the parameter $\epsilon_{SOP}$ can be estimated as a function of a sufficiently large number $n_{SOP}$, wherein the distribution of these SOPs is assumed to be approximately known, by employing an ab initio statistical approach, from a probability density function on $\epsilon_{SOP}$. It is noted that the parameter $\epsilon_{SOP}$ used herein is related to the κ in International Patent Application Publication WO 2011/020195 A1, by the relation $\epsilon_{SOP} = (1-\kappa)$.

When the SOPs are independently and uniformly distributed on the Poincaré sphere, the expectation value μ of the calculated probability distribution function yields the following ab initio estimated $\epsilon_{SOP}$, as a function of the number $n_{SOP}$:

$$\varepsilon_{SOP} = \frac{1}{2(n_{SOP}+1)} \tag{37}$$

In a more general case where the SOPs provide good coverage of the Poincaré sphere but are not highly uniformly distributed thereon, $\epsilon_{SOP}$ can be estimated, for $n_{SOP} \gg 1$, by:

$$\varepsilon_{SOP} \approx \frac{1}{2C_e n_{SOP}} \tag{38}$$

where $C_e$ is a factor dependent upon the polarization-scrambling efficiency.

The parameter $\epsilon_{PBS}$ may be determined by a pre-calibration procedure of the system used for conducting the polarization-sensitive spectrum analysis (VSOP-OSA 210 of FIG. 2 for instance). To this end, a polarized calibration signal is input to the VSOP-OSA 210, which is easily generated so as to exhibit negligible ASE noise ($N_{ASE}(\lambda) \approx 0$) and negligible NLEs and PMD effects such that ξ is close to zero. Then, by applying a sufficiently large number of SOP analysis conditions $n_{SOP}(\rightarrow \infty)$, $\epsilon_{SOP}$ becomes negligible, and:

$$\epsilon_{PBS} = P_{minmin}(\lambda)/P_{sum}(\lambda) \tag{39}$$

Similarly, the parameter $\epsilon_{SOP}$ may also be estimated from a pre-calibration procedure for a given $n_{SOP}$ value if $\epsilon_{PBS}$ is known. Again, a polarized calibration signal is input to the VSOP-OSA 210, which is generated so as to exhibit no or very low ASE noise ($N_{ASE}(\lambda) \approx 0$) and no or very minor NLEs and PMD effects such that ξ is close to zero or negligible compared to $\epsilon_{SOP}$. The calibration source should be substantially polarized, i.e. have a degree of depolarization that is close to 0, or at least, much smaller than $\epsilon_{SOP}$ as estimated in Equation (37) for the given $n_{SOP}$. Acquisition is then conducted for number $n_{SOP}$ of SOP analysis conditions. Then, for the given $n_{SOP}$, $\epsilon_{SOP}$ may be evaluated as:

$$\epsilon_{SOP} = P_{minmin}(\lambda)/P_{sum}(\lambda) - \epsilon_{PBS} \tag{40}$$

Similarly, $\epsilon = \epsilon_{SOP} + \epsilon_{PBS}$ may be evaluated as a whole by applying the same pre-calibration procedure and:

$$\epsilon = \epsilon_{SOP} + \epsilon_{PBS} = P_{minmin}(\lambda)/P_{sum}(\lambda) \tag{41}$$

In step 810, the depolarized-signal $S_{dp}(\lambda)$ and polarized-signal $S_p(\lambda)$ contributions are discriminated in $P'_{minmin}(\lambda)$ and $P'_{sum}(\lambda)$. Step 810 may be implemented, for example, by the spectrum processor 212 of FIG. 2.

Knowing the coefficient ϵ, the polarized-signal contribution $S_p(\lambda)$ may be found from $P'_{sum}(\lambda)$ or $P'_{minmin}(\lambda)$ or, equivalently, from the differential optical spectrum trace ΔP(λ), as follows:

$$S_p(\lambda) = \frac{P'_{sum}(\lambda) - 2P'_{minmin}(\lambda)}{1 - 2\varepsilon} = \frac{\Delta P(\lambda)}{1 - 2\varepsilon} \tag{42}$$

and, knowing the ASE-noise contribution $N_{ASE}(\lambda)$ from step 806, we find:

$$S_{dp}(\lambda) = 2P'_{minmin}(\lambda) - N_{ASE}(\lambda) - 2\epsilon S_p(\lambda) \tag{43}$$

Having discriminated the depolarized-signal $S_{dp}(\lambda)$ and polarized-signal $S_p(\lambda)$ contributions, the coefficient ξ may be calculated as per its definition, i.e.:

$$\xi = \frac{S_{dp}(\lambda)}{S_p(\lambda) + S_{dp}(\lambda)} \tag{44}$$

If no ASE-noise parameter is to be determined, step 810 may be replaced by a simple evaluation of the coefficient ξ based, for example on the following equation that is obtained following a polarization-sensitive spectrum analysis of the SUT as described hereinabove and combining Equations (7b), (11), (15a) and (15b):

$$\xi = \frac{1}{1-2\varepsilon}\left(\frac{2P'_{minmin}(\lambda) - N_{ASE}(\lambda)}{P'_{sum}(\lambda) - N_{ASE}(\lambda)} - 2\varepsilon\right) \tag{45}$$

Then, from $N_{ASE}(\lambda)$ and ϵ as determined in the previous steps, the coefficient ξ may be evaluated directly.

Once all contributions have been discriminated, in step 812, the noise parameter or noise parameters to be characterized, i.e. either or both an ASE-noise parameter, e.g. the ASE-only OSNR, or a non-ASE noise parameter, e.g. a degree of signal depolarization parameter, are calculated from at least one or a combination of the discriminated polarized-signal $S_p(\lambda)$, depolarized-signal $S_{dp}(\lambda)$ and ASE-noise $N_{ASE}(\lambda)$ contributions. The thereby-determined noise parameter(s) are then output for use, for example, in monitoring, maintenance or troubleshooting of a DWDM optical system. For example, the noise parameter(s) can be output by graphical display, by printing, by generating an electrical signal or by storage in memory for later retrieval. Other parameters may also be displayed or otherwise output in a graphical or numerical form. Step 810 may be implemented, for example, by employing the noise calculator 214 of FIG. 2.

Examples of noise parameters that may be determined and subsequently output are the ASE-only OSNR as per Equation (25) and the optical-signal ($S(\lambda)$) to depolarization-noise ($S_{dp}(\lambda)$) ratio (depolarization-OSNR), which may be defined, in dB units, as:

$$10\log_{10}\left(\frac{S(\lambda)}{S_{dp}(\lambda)}\right) = 10\log_{10}\left(\frac{1}{\xi}\right) \quad (46)$$

Of course, any other useful ASE-noise parameters and/or non-ASE noise parameters may also be determined and subsequently output.

As mentioned hereinabove, signal depolarization that is manifest on optical spectrum traces acquired with a commercial OSA, i.e. having a non-zero RBW, is characterized by both a NLE-induced signal depolarization and a PMD-related signal depolarization, such that $\xi=\xi_{NLE}+\xi_{PMD}$. The coefficient $\xi$ of signal depolarization comprising both NLE-induced and PMD-related signal depolarization is determined from the aforedescribed method. However, it may be useful to discriminate the NLE-induced signal depolarization $\xi_{NLE}$ from the PMD-related signal depolarization $\xi_{PMD}$ coefficients for better characterization of NLEs on a SUT.

To this end, the degree of PMD-related signal depolarization, related to the effective DGD-induced temporal pulse broadening $\tau_{PPB}$ and to the RBW of OSA, may be estimated by:

$$\xi_{PMD} = C_f(\pi^2/8\ \ln^2)\tau^2_{PPB}\Delta v^2_{RBW} \quad (47)$$

where $\Delta v_{RBW}$ is the RBW (full width at half maximum) of the OSA, and $C_f$ is a constant factor related to the filter shape of the OSA, $f(\lambda)$. For a filter having a Gaussian shape, this constant factor $C_f$ is equal to unity ($C_f=1$). It should be appreciated that, although the $\xi_{PMD}$ coefficient may vary with wavelength, these "second-order" variations generally may be neglected within the signal bandwidth and an average value coefficient employed. If the DGD-induced temporal polarization pulse broadening $\tau_{PPB}$ for a particular SOP of the signal is already known or may be evaluated, the parameter $\xi_{PMD}$ is easily estimated using Equation (47). Of course, any method known in the art for measuring or estimating $\xi_{eff}$ may be employed, e.g. the "Jones Matrix Eigenanalysis (JME)" method.

Another method for estimating the effective DGD effect $\tau_{PPB}$ is disclosed herein. This method is based on the SOP variation of the polarized signal as a function of optical frequency.

Among the $n_{SOP}$ acquired pairs of optical spectrum traces $P_{//}(\lambda)$, $P_\perp(\lambda)$, the pair of traces $P_{max}(v)$ and $P_{min}(v)$ which corresponds to the maximum ratio $P_{//}(v_0)/P_\perp(v_0)$ or $P_\perp(v_0)/P_{//}(v_0)$ at given optical frequency within the signal bandwidth (typically selected as the signal peak optical frequency $v_0$) is selected. The selected pair corresponds to orthogonal SOP analysis conditions as obtained concurrently at outputs $p_{//}$ and $p_\perp$ of the polarization beam splitter 220 of FIG. 2. If the DGD (PMD) effect on the SUT is small or negligible, we have:

$$P_{min}(v)=P_{minmin}(v) \quad (48a)$$

$$P_{max}(v)=P_{sum}(v)-P_{minmin}(v)=P_{maxmax}(v) \quad (48b)$$

However, in the presence of DGD (PMD) effects, the SOP of the polarized signal contribution $S_p$ varies as a function of wavelength. As a consequence, the residual angle $\delta(v)$, in the Jones-vector domain, between the SOP of the polarized signal contribution $S_p(\lambda)$ and one of the polarization axes of the polarization beam splitter 220, which corresponds to the acquisition of the pair of traces $P_{min}(v)$ and $P_{max}(v)$, also actually varies as a function of wavelength, and so is the coefficient $\epsilon_{SOP}(v)$ of residual polarized-signal contribution. Hence, at $v=v_0$:

$$P_{min}(v_0)=P_{minmin}(v_0) \quad (49a)$$

$$P_{max}(v_0)=P_{maxmax}(v_0) \quad (49b)$$

but, over the optical-signal bandwidth:

$$P_{min}(v)\neq P_{minmin}(v) \quad (49c)$$

$$P_{max}(v)\neq P_{maxmax}(v) \quad (49d)$$

Defining a power-ratio spectrum $R(v)$ as:

$$R(v) = [P_{max}(v) - P_{min}(v)]/[P_{max}(v) + P_{min}(v) - 2P_{minmin}(v)] \quad (50)$$

$$= [1 - 2\varepsilon_{SOP}(v)]/[1 - 2\varepsilon_{SOP}(v_0)]$$

$$\approx [n_{sop} + 1]/n_{sop}][1 - 2\varepsilon_{SOP}(v)] \approx 1 - 2\varepsilon_{SOP}(v)$$

For a sufficiently large number of $n_{SOP}$ and given the particular residual angle $\delta(v)$, by employing the relation $\tau_{PPB}=(1/\pi)(d\delta(v)/dv)$, and considering $\sin(2\delta)\to 0$ or $\cos(2\delta)\to 1$, $\xi_{PMD}$ and $\tau_{PPB}$ may be estimated by:

$$\tau^2_{PPB} = \frac{1}{4\pi^2}|(d^2 R(v))/dv^2| \quad (51)$$

$$\xi_{PMD} = (C_f/32\ln 2)|d^2 R(v)/dv^2|\Delta v^2_{RBW} \quad (52)$$

$$\xi_{NLE} = \xi - \xi_{PMD} \quad (53)$$

Another method for distinguishing $\xi_{NL}$ from $\xi_{PMD}$ is proposed herein. This method is based on the dependence of $\xi_{PMD}$ as a function of the RBW, $\Delta v_{RBW}$, of the OSA, as can be observed in Equation (48), and the fact that $\xi_{NL}$ is independent of $\Delta v_{RBW}$. Then, two sets of polarization-sensitive spectrum analysis data are acquired as mentioned above with respective two RBWs of OSA, i.e $RBW_1$ and $RBW_2$. From Equations (45) and (48), one obtains:

$$\xi_1=P_1=[(2P_{minmin1}(\lambda)-N_{ASE1}(\lambda))/(P_{sum1}(\lambda)-N_{ASE1}(\lambda))-2\epsilon_1]/(1-2\epsilon_1) \quad (54a)$$

$$\xi_2=P_2=[(2P_{minmin2}(\lambda)-N_{ASE2}(\lambda))/(P_{sum2}(\lambda)-N_{ASE2}(\lambda))-2\epsilon_2]/(1-2\epsilon_2) \quad (54b)$$

where $\xi_1$, $\epsilon_1$, $P_1$, $P_{minmin1}(\lambda)$, $P_{sum1}(\lambda)$ and $N_{ASE1}(\lambda)$ correspond to the polarization-sensitive spectrum analysis data as obtained with $RBW_1$, and $\xi_2$, $\epsilon_2$, $P_2$, $P_{minmin2}(\lambda)$, $P_{sum2}(\lambda)$ and $N_{ASE2}(\lambda)$ correspond to the polarization-sensitive spectrum analysis data as obtained with $RBW_2$.

And defining:

$$\beta = \xi_{PMD2}/\xi_{PMD1} = (RBW_2/RBW_1)^2 \quad (55)$$

The NLE-induced signal depolarization coefficient $\xi_{NL}$ is then determined as follows:

$$\xi_{NL} = (P_2 - \beta P_1)/(1-\beta) \quad (56)$$

The thereby-discriminated NLE-induced signal depolarization coefficient $\xi_{NLE}$ may then be used to characterize NLEs on the SUT. An example of a noise parameter that may be determined to characterize NLEs is an optical-signal $(S(\lambda))$ to NLE-induced depolarization-noise $(S_{dp}(\lambda)_{NLE})$ ratio (or NLE-depolarization-OSNR), such as:

$$10\log_{10}\left(\frac{S(\lambda)}{S_{dp}(\lambda)_{NLE}}\right) = 10\log_{10}\left(\frac{1}{\xi_{NLE}}\right) \quad (57)$$

The PMD-related signal depolarization $\xi_{PMD}$ coefficient may also constitute a noise parameter characterizing the SUT. Another example of a noise parameter that may be determined to characterize the SUT is an optical-signal $(S(\lambda))$ to polarization-pulse-broadening-depolarization-noise $(S_{dp}(\lambda)_{PMD})$ ratio (or PPS-depolarization-OSNR), which may be defined, in dB units, as:

$$10\log_{10}\left(\frac{S(\lambda)}{S_{dp}(\lambda)_{PMD}}\right) = 10\log_{10}\left(\frac{1}{\xi_{PMD}}\right) \quad (58)$$

It should be appreciated that the different steps described herein are provided for purpose of illustration and that they may be varied without departing from the general concept described herein. For example, some steps may be omitted or interchanged. For instance, step 804, corresponding to discrimination of the carrier-leakage contribution, may be adapted to allow it to be undertaken subsequent to steps 808 and 810, these latter steps corresponding to discrimination between the ASE-noise, the depolarized-signal and the polarized-signal contributions.

Third Embodiment

It should be appreciated that the disclosed method is not limited to live (i.e. real data-carrying) channels, but may also be used to characterize non-ASE optical noise on one or more non-data-carrying test channels (i.e. dark channels) of an optical telecommunication system.

To this end, a test source may be used generate a probe optical signal that is propagated in the optical telecommunication channel to be characterized. In accordance with this third embodiment, the test source is a polarized Continuous Wave (CW) source, i.e. non-modulated, having, for instance, a spectral extent that encompasses a significant portion of the effective optical channel bandwidth. However, it should be appreciated that a modulated test source may be employed as well. The test source is inserted at the transmitter end of the optical telecommunication link. At the receiver end, or anywhere else along the optical link, the propagated probe signal will typically undergo the same impairments as a data-carrying signal, and consequently characterization of the probe signal enables characterization of the optical channel.

Accordingly, in this third embodiment, the SUT corresponds to the probe signal as propagated through the optical channel under characterization. As in the method of the second embodiment, the probe signal (SUT) which is being characterized and which is representative of non-ASE optical noise on the optical telecommunication channel, then comprises a depolarized-signal contribution $S_{dp}(\lambda)$, a polarized-signal contribution $S_p(\lambda)$ and an ASE-noise contribution $N_{ASE}(\lambda)$. However, contrary to a data-carrying SUT and if it does not undergo modulation, there is no carrier leakage on the probe signal.

In accordance with the method of this third embodiment, the steps of the method of FIG. 8 are applied on the probe signal as they would be on the SUT of the second embodiment, except for step 804 of discriminating the carrier leakage, which is omitted in the case of a CW probe signal since there is then no possible carrier leakage. The fact that the probe signal has a chosen known optical spectrum serves to facilitate implementation of step 806 of evaluating the ASE-noise contribution $N_{ASE}(\lambda)$ and all other steps remain unchanged.

It should be appreciated that in other cases where a modulated probe signal is used instead of a Continuous Wave (CW) source, the method of the second embodiment may still be applied to the modulated probe signal.

Other Variations

The embodiments described hereinabove use polarization-sensitive spectrum analysis to discriminate non-ASE optical noise contributions from signal and ASE-noise contributions. However, the carrier-leakage contribution may also be discriminated from the other contributions without resort to polarization-sensitive spectrum analysis. For example, this may be made possible by simply employing knowledge of the spectral shape of the signal contribution.

Accordingly, in yet another embodiment, the discrimination between the carrier leakage contribution and the other contributions is carried out using the known or predetermined spectral shape of the signal contribution. To this end, an optical spectrum trace $P(\lambda)$ of the SUT, including the carrier-leakage contribution and all other contributions, is acquired. Then, in order to estimate the signal contribution $S(\lambda)$ in optical spectrum trace $P(\lambda)$, the spectral shape of the signal contribution is fitted on optical spectrum trace $P(\lambda)$. The result of the fit provides an estimation of the signal contribution $S(\lambda)$, including both polarized-signal contribution $S_p(\lambda)$ and any possible depolarized-signal contribution $S_{dp}(\lambda)$. After $S(\lambda)$ has been so determined, $[C_L(\lambda) + N_{ASE}(\lambda)]$ may be found as:

$$C_L(\lambda) + N_{ASE}(\lambda) = P(\lambda) - S(\lambda) \quad (59)$$

and $C_L(\lambda)$ may then be discriminated from $N_{ASE}(\lambda)$ in $[C_L(\lambda) + N_{ASE}(\lambda)]$ by means of a shoulder interpolation for example.

It should be noted that the precision of the estimation thus achieved increases with the relative contribution of carrier leakage and thus of the relevance of evaluating it.

It should be appreciated that many other variations of the embodiments described herein are also possible.

For example, it will be appreciated that in DWDM optical telecommunication systems having a large number of channels, the signal in each channel generally suffers from similar NLE-induced signal depolarization, which may be characterized, for example, by the NLE-induced signal depolarization coefficient NILE, provided that the SOP relation between each signal of the DWDM channels is arbitrary. More specifically, NLE-induced signal depolarization that is present on a DWDM optical channel may generally be considered indicative of NLE-induced signal depolarization on neighboring channels copropagating in the same optical fiber.

Accordingly, in one embodiment, NLE-induced signal depolarization on a channel-under-test is being evaluated by actually applying the method of the second embodiment, or a variant thereof, on another channel of the DWDM optical telecommunication link, the value obtained being indicative of NLE-induced signal depolarization on the channel-under-test. This may be of particular value in the case of a polarization-multiplexing—non-polarization-multiplexing mixed system, such as 40G-10G mixed systems, for instance, for which 40G channels are polarization-multiplexed whereas 10G channels are non-polarization multiplexed. In this case, the method of the second embodiment cannot be applied to the polarization-multiplexed channels. However, characterization of NLE-induced signal depolarization on non-polarization-multiplexed channels provides for an estimation of the NLE-induced signal depolarization on nearby polarization-multiplexed channels. Moreover, in other embodiments, NLE-induced signal depolarization may be characterized on a plurality of channels of a DWDM system and the values obtained be averaged to determine a NLE-related noise parameter that applies to any channel of the DWDM systems.

Although illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The illustrated structure is thus only provided for efficiency of teaching the described embodiment.

The embodiments described above are intended to be illustrative only. The scope of the invention is therefore intended to be limited solely by the appended claims.

What is claimed is:

1. A method for determining a noise parameter characterizing an optical signal-under-test having a signal contribution, an Amplified Spontaneous Emission (ASE) noise contribution and a non-ASE optical noise contribution within an optical-signal bandwidth, wherein said signal contribution is polarized and wherein said non-ASE optical noise contribution comprises a depolarized-signal contribution, said method comprising:
acquiring, for each of a number nSOP of varied state-of-polarization analysis conditions of the signal-under-test, at least one polarization-analyzed optical spectrum trace using an optical spectrum analyzer;
using a spectrum processor, discriminating at least said non-ASE optical noise contribution from said ASE-noise contribution using at least one of the at least one polarization-analyzed optical spectrum trace and a trace obtained from the at least one polarization-analyzed optical spectrum trace;
using a noise calculator, determining said noise parameter characterizing said signal-under-test using at least one of the discriminated non-ASE optical noise contribution and the discriminated ASE-noise contribution; and
outputting said noise parameter;
further comprising: determining an extrema trace from the at least one polarization-analyzed optical spectrum trace;
wherein said discriminating is made using said extrema trace.

2. The method as claimed in claim 1, wherein said discriminating is based on known different spectral-shape properties between said non-ASE optical noise contribution and said ASE-noise contribution.

3. The method as claimed in claim 2, wherein said discriminating comprises discriminating at least said non-ASE optical noise contribution from said ASE-noise contribution and said signal contribution based on known different spectral-shape properties between said non-ASE optical noise contribution, said ASE-noise contribution and said signal contribution.

4. The method as claimed in claim 1, wherein said non-ASE optical noise contribution comprises at least a carrier-leakage contribution.

5. The method as claimed in claim 1, wherein said signal contribution comprises a data-carrying signal contribution.

6. The method as claimed in claim 1, wherein the signal-under-test is a non-data-carrying probe optical signal as propagated over an optical communication channel to be characterized, said signal contribution comprising a probe signal contribution and characterization of said noise parameter on said signal-under-test provides a characterization of said optical communication channel.

7. The method as claimed in claim 1, wherein said discriminating comprises discriminating at least said depolarized-signal contribution from said ASE-noise contribution in said extrema trace based on known different spectral-shape properties between said depolarized-signal contribution and said ASE-noise contribution.

8. The method as claimed in claim 1, wherein said extrema trace is a composite extrema trace obtained by selecting, for each wavelength individually, an extrema value among said optical spectrum traces.

9. The method as claimed in claim 8, wherein said composite extrema trace is a constructed composite extrema trace obtained by a normalization of a total optical spectrum trace of said signal-under-test using an extrema trace.

10. The method as claimed in claim 1, wherein said depolarized-signal contribution comprises a Non-Linear-Effect-induced (NLE-induced) signal depolarization part and a Polarization-Mode-Dispersion-related (PMD-related) signal depolarization part, and wherein said method comprises:
estimating said PMD-related signal depolarization part from a PMD parameter indicative of a PMD-related signal depolarization part in said signal-under-test; and
estimating said NLE-induced signal depolarization part using the discriminated depolarized-signal part and the estimated PMD-related signal depolarization part;
wherein said noise parameter is determined using at least the estimated NLE-induced signal depolarization part.

11. The method as claimed in claim 10, further comprising:
from the at least one polarization-analyzed optical spectrum trace, selecting a maximum trace and a minimum trace;
from the at least one polarization-analyzed optical spectrum trace, determining a composite extrema trace obtained by selecting, for each wavelength individually, an extrema value among the at least one polarization-analyzed optical spectrum trace; and
estimating said PMD-related signal depolarization part using a power-ratio spectral trace calculated from at least said maximum trace and said minimum trace and said composite extrema trace.

12. The method as claimed in claim 1, wherein said depolarized-signal contribution comprises a Non-Linear- Effect-induced (NLE-induced) signal depolarization part, said method further comprising:
  estimating said NLE-induced signal depolarization part on a first said optical signal-under-test using the discriminated depolarized-signal part; and
  estimating a NLE-induced signal depolarization part on a second optical signal-under-test of a same wavelength-division-multiplexing communication link from the NLE-induced signal depolarization part as estimated on at least the first said optical signal-under-test.

13. The method as claimed in claim 1, wherein, for each of said number nSOP of varied state-of-polarization analysis conditions of the signal under test, a pair of mutually orthogonal polarization-analyzed optical spectrum traces is acquired.

14. The method as claimed in claim 1, wherein said noise parameter comprises an ASE-only Optical Signal-to-Noise Ratio (ASE-only OSNR).

15. The method as claimed in claim 1, wherein said noise parameter comprises a signal-depolarization parameter.

16. A method for determining a noise parameter characterizing an optical signal-under-test having a signal contribution, a carrier-leakage contribution and an Amplified Spontaneous Emission (ASE-) noise contribution within an optical-signal bandwidth, said method comprising:
  acquiring at least one optical spectrum trace of said signal-under-test using an optical spectrum analyzer;
  using a spectrum processor, discriminating at least said carrier-leakage contribution from said ASE-noise contribution using at least one of said optical spectrum trace and a trace obtained from said at least one optical spectrum trace;
  using a noise calculator, determining said noise parameter on said signal-under-test using at least one of the discriminated carrier-leakage contribution and the discriminated ASE-noise contribution; and
  outputting said noise parameter;
  wherein said acquiring comprises, for each of a number nSOP of varied state-of-polarization analysis conditions of the signal under test, the acquisition of at least one of said optical spectrum trace of said signal-under-test, wherein said optical spectrum trace is a polarization-analyzed optical spectrum trace;
  further comprising: from the at least one polarization-analyzed optical spectrum trace, determining an extrema trace; and
  wherein said discriminating is made using said extrema trace.

17. The method as claimed in claim 16, wherein said discriminating comprises discriminating at least said carrier-leakage contribution from said ASE-noise contribution in said extrema trace based on known different spectral-shape properties between said carrier-leakage contribution and said ASE-noise contribution.

18. The method as claimed in claim 16, wherein a spectral shape of said carrier-leakage contribution is known and wherein said discriminating comprises discriminating at least said carrier-leakage contribution from said ASE-noise contribution in said extrema trace using the known spectral shape of said carrier-leakage contribution.

19. The method as claimed in claim 16, wherein said extrema trace is a minima trace.

20. The method as claimed in claim 19, wherein said discriminating comprises performing an interpolation on said minima trace to estimate said ASE-noise contribution in said minima trace.

21. The method as claimed in claim 20, wherein said interpolation is a linear interpolation.

22. The method as claimed in claim 19, wherein said minima trace comprises a residual modulated signal contribution and wherein said method further comprises discriminating said carrier-leakage contribution from said residual modulated signal contribution and said ASE-noise contribution using a curve fit on said minima trace.

23. The method as claimed in claim 22, wherein said curve fit fits a reference trace on said minima trace.

24. The method as claimed in claim 16, wherein said extrema trace is a composite minima trace obtained by selecting, for each wavelength individually, a minima value among said optical spectrum traces.

25. The method as claimed in claim 16, wherein, for each of said number nSOP of varied state-of-polarization analysis conditions of the signal under test, a pair of mutually orthogonal polarization-analyzed optical spectrum traces is acquired.

26. The method as claimed in claim 16, wherein said noise parameter comprises a carrier-leakage parameter.

27. The method as claimed in claim 16, wherein said noise parameter comprises an ASE-noise parameter.

28. The method as claimed in claim 16, wherein said noise parameter comprises an ASE-only Optical Signal-to-Noise Ratio (ASE-only OSNR).

29. The method as claimed in claim 16, wherein said noise parameter comprises a carrier-leakage extinction ratio.

* * * * *